(12) United States Patent
Okumura et al.

(10) Patent No.: US 11,909,347 B2
(45) Date of Patent: Feb. 20, 2024

(54) STEPPING MOTOR CONTROL DEVICE, MOVEMENT, TIMEPIECE, AND STEPPING MOTOR CONTROL METHOD

(71) Applicant: Seiko Watch Kabushiki Kaisha, Tokyo (JP)

(72) Inventors: Akihito Okumura, Chiba (JP); Kosuke Yamamoto, Chiba (JP); Tetsuya Nobe, Chiba (JP); Kazumi Sakumoto, Chiba (JP)

(73) Assignee: SEIKO WATCH KABUSHIKI KAISHA, Tokyo (JP)

( * ) Notice: Subject to any disclaimer, the term of this patent is extended or adjusted under 35 U.S.C. 154(b) by 108 days.

(21) Appl. No.: 17/541,779

(22) Filed: Dec. 3, 2021

(65) Prior Publication Data
US 2022/0181997 A1  Jun. 9, 2022

(30) Foreign Application Priority Data

Dec. 8, 2020 (JP) .................................. 2020-203383
Sep. 29, 2021 (JP) .................................. 2021-159512

(51) Int. Cl.
*H02M 1/12* (2006.01)
*H02P 8/12* (2006.01)
*H02K 7/14* (2006.01)

(52) U.S. Cl.
CPC ..................... *H02P 8/12* (2013.01); *H02K 7/14* (2013.01)

(58) Field of Classification Search
CPC ................. H02P 8/02; H02P 5/00; H02P 8/34
See application file for complete search history.

(56) References Cited

U.S. PATENT DOCUMENTS

2019/0219969 A1* 7/2019 Kawata .................. G04B 19/02
2019/0273456 A1* 9/2019 Okumura ................. H02P 8/02
2021/0263474 A1* 8/2021 Takyoh .................. G04C 3/143

FOREIGN PATENT DOCUMENTS

JP       S62-291591 A    12/1987

* cited by examiner

*Primary Examiner* — Kawing Chan
*Assistant Examiner* — Charles S Laughlin
(74) *Attorney, Agent, or Firm* — Crowell & Moring LLP

(57) ABSTRACT

A stepping motor control device includes a driving unit that drives a stepping motor including a rotor that rotates a hand and a coil that generates a magnetic flux for rotating the rotor, a control unit that outputs, to the driving unit, a driving pulse for rotating the rotor and a swinging pulse for swinging the rotor, a voltage detecting unit that detects an induced voltage generated in the coil when the rotor vibrates, and a determining unit that determines, based on a result of the detection of the voltage detecting unit, a mechanical load received by the rotor.

21 Claims, 23 Drawing Sheets

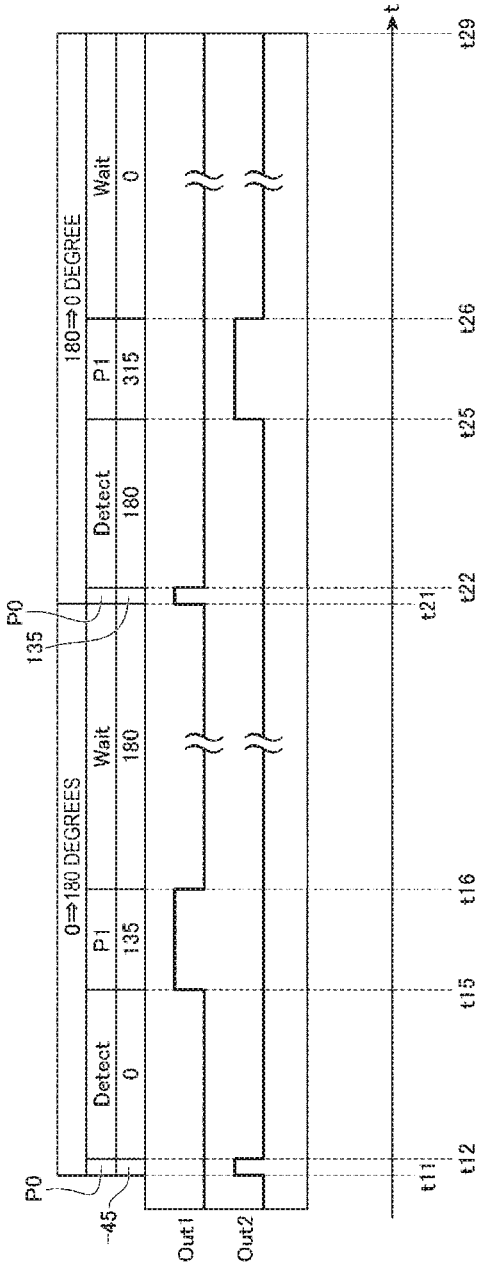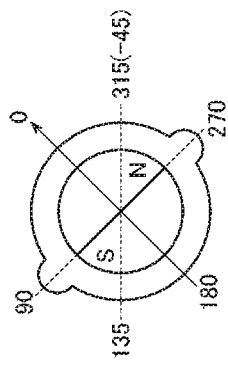

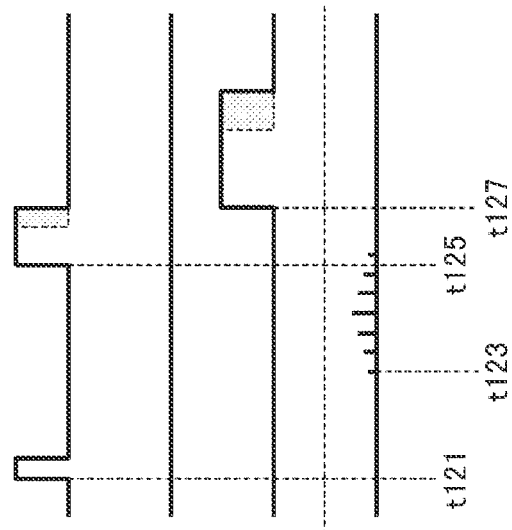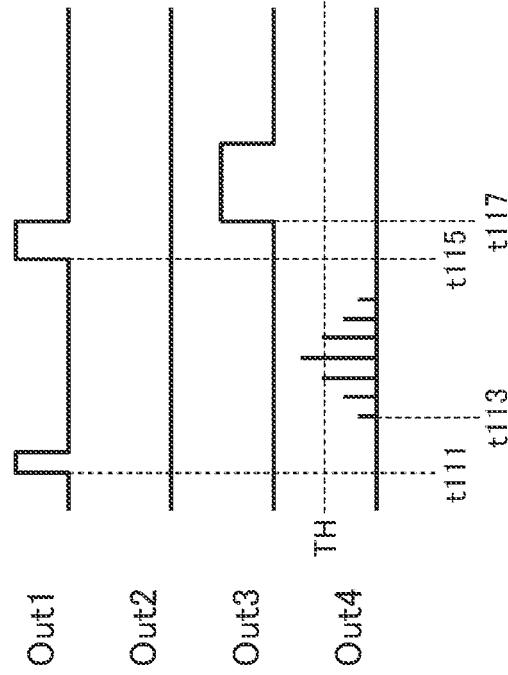

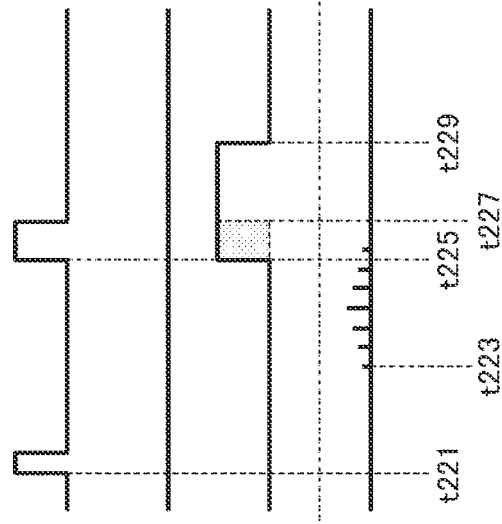
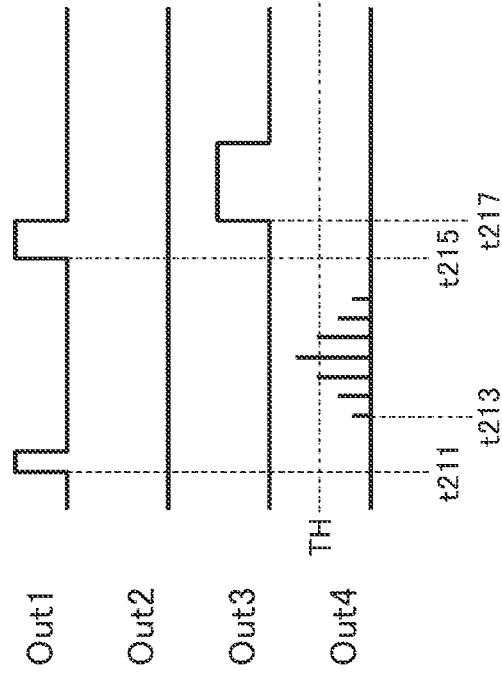

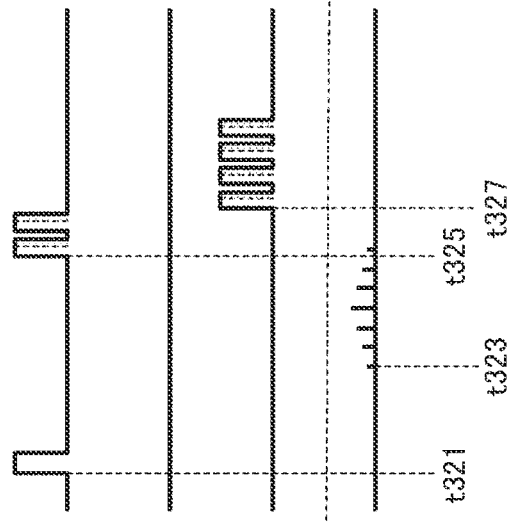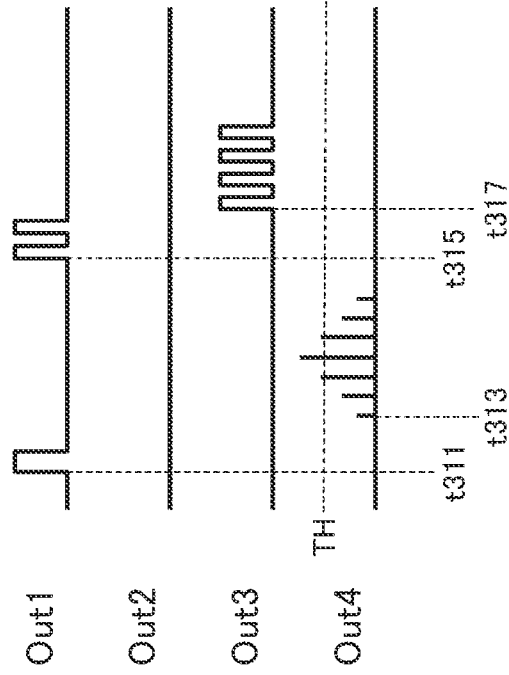

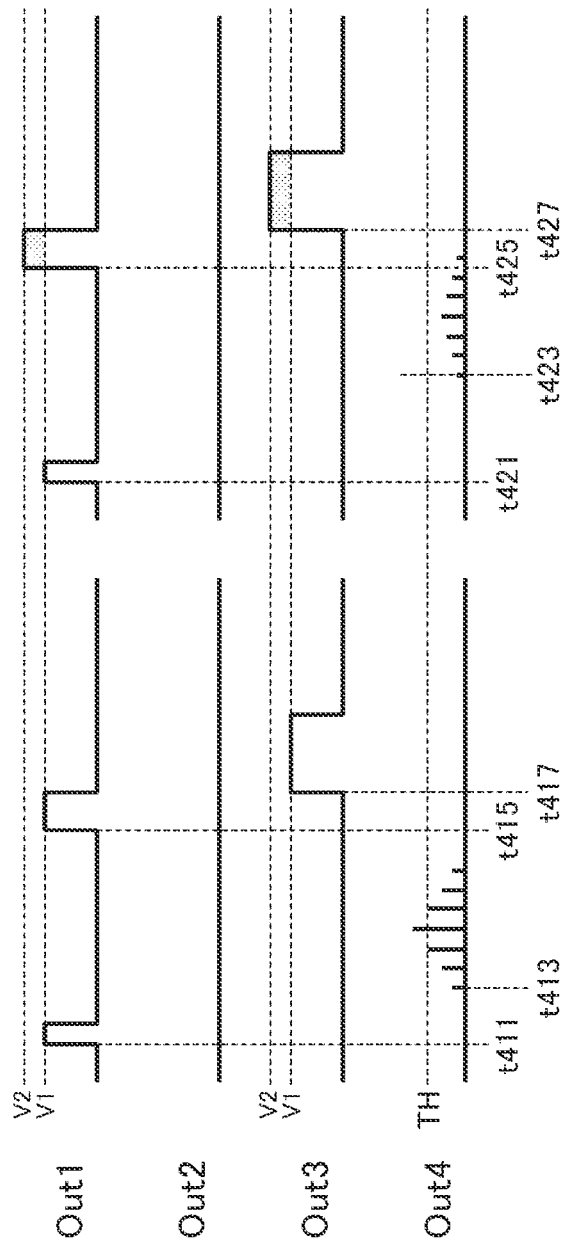

STEPPING MOTOR CONTROL DEVICE, MOVEMENT, TIMEPIECE, AND STEPPING MOTOR CONTROL METHOD

RELATED APPLICATIONS

This application claims priority to Japanese Patent Application No. 2020-203383, filed on Dec. 8, 2020 and Japanese Patent Application No. 2021-159512, filed on Sep. 29, 2021, the entire contents of which are incorporated herein by reference.

BACKGROUND OF THE INVENTION

1. Field of the Invention

The present invention relates to a stepping motor control device, a movement, a timepiece, and a stepping motor control method.

2. Description of the Related Art

There has been a method of detecting the position of a hand of a timepiece. For example, there has been proposed a technique for driving a stepping motor with a driving pulse at a normal driving time and detecting a rotation state of a rotor with an induced voltage (see, for example, JP-A-62-291591).

According to the related art described in JP-A-62-291591, for the detection of the rotation state of the rotor, after a normal driving pulse is applied to the stepping motor, the rotor needs to vibrate at constant or higher speed and generate an induced voltage equal to or higher than a predetermined threshold voltage. However, there has been a problem in that, depending on a motor, an induced voltage is less easily generated and it is difficult to detect a rotation state.

SUMMARY OF THE INVENTION

The present invention has been devised in view of such a situation, and an object of the present invention is to perform detection of the position of a hand.

A stepping motor control device according to an aspect of the present invention includes: a driving unit that drives a stepping motor including a rotor that rotates a hand and a coil that generates a magnetic flux for rotating the rotor; a control unit that outputs, to the driving unit, a driving pulse for rotating the rotor and a swinging pulse for swinging the rotor; a voltage detecting unit that detects an induced voltage generated in the coil when the rotor vibrates; and a determining unit that determines, based on a result of the detection of the voltage detecting unit, a mechanical load received by the rotor.

In the stepping motor control device according to the aspect of the present invention, after outputting the swinging pulse, the control unit outputs the driving pulse after a predetermined period elapses.

In the stepping motor control device according to the aspect of the present invention, the determining unit determines, as the mechanical load, whether a first gear that rotates based on the rotation of the rotor is in contact with a load tooth of a second gear including the load tooth.

In the stepping motor control device according to the aspect of the present invention, the control unit controls, according to the mechanical load determined by the determining unit, energy for driving the stepping motor.

In the stepping motor control device according to the aspect of the present invention, the control unit controls an output time of the driving pulse to thereby control the energy for driving the stepping motor.

In the stepping motor control device according to the aspect of the present invention, the control unit controls an excitation method for the stepping motor to thereby control the energy for driving the stepping motor.

In the stepping motor control device according to the aspect of the present invention, the control unit controls a duty ratio of the driving pulse to thereby control the energy for driving the stepping motor.

In the stepping motor control device according to the aspect of the present invention, the control unit controls a voltage of the driving pulse to thereby control the energy for driving the stepping motor.

In the stepping motor control device according to the aspect of the present invention, the swinging pulse is a first swinging pulse having energy for rotating the rotor in a first rotation direction, the first swinging pulse swinging the rotor, or a second swinging pulse having energy for rotating the rotor in a second rotation direction after the first swinging pulse is output, the second swinging pulse swinging the rotor.

In the stepping motor control device according to the aspect of the present invention, the first rotation direction is a normal rotation direction, and the second rotation direction is an opposite direction of the first rotation direction.

In the stepping motor control device according to the aspect of the present invention, the control unit outputs the first swinging pulse when outputting the swinging pulse according to a predetermined cycle at which the driving pulse is output and outputs the first swinging pulse and the second swinging pulse when outputting the swinging pulse at predetermined timing not corresponding to the predetermined cycle at which the driving pulse is output.

In the stepping motor control device according to the aspect of the present invention, the determining unit determines, based on whether a voltage value detected by the voltage detecting unit has exceeded a predetermined threshold, the mechanical load received by the rotor.

In the stepping motor control device according to the aspect of the present invention, the determining unit determines, based on whether generation timing of a voltage value detected by the voltage detecting unit is within a predetermined period, the mechanical load received by the rotor.

In the stepping motor control device according to the aspect of the present invention, the control unit has a swinging pulse output mode for outputting the swinging pulse and a swinging pulse non-output mode for not outputting the swinging pulse.

In the stepping motor control device according to the aspect of the present invention, the driving unit drives the stepping motor at a first voltage when the driving pulse is output from the control unit and drives the stepping motor at a second voltage lower than the first voltage when the swinging pulse is output from the control unit.

In the stepping motor control device according to the aspect of the present invention, the control unit applies, when the mechanical load received by the rotor determined by the determining unit is smaller than a predetermined threshold, the driving pulse of a larger rank than the driving pulse applied immediately before the driving pulse among the driving pulses of a plurality of ranks having different energies and applies, when a result indicating that the mechanical load received by the rotor determined by the determining unit is larger than the predetermined threshold is continuously obtained a predetermined number of times or more, the driving pulse of a smaller rank than the driving pulse applied immediately before the driving pulse among the driving pulses of the plurality of ranks having the different energies.

In the stepping motor control device according to the aspect of the present invention, when a gear including a load tooth makes one turn, the control unit selects, based on a number of times it is determined by the determining unit that the mechanical load received by the rotor is larger than a predetermined threshold, the swinging pulse of which rank among the swinging pulses of a plurality of ranks having different energies is applied.

In the stepping motor control device according to the aspect of the present invention, the control unit does not perform the control of the driving pulse while the control unit controls a rank of the swinging pulse.

A movement according to an aspect of the present invention includes the stepping motor control device explained above; and the stepping motor.

A timepiece according to an aspect of the present invention includes the movement explained above.

A stepping motor control method according to an aspect of the present invention includes: applying a driving pulse to a stepping motor, which includes a rotor that rotates a hand and a coil that generates a magnetic flux for rotating the rotor, to thereby rotate the rotor or applying a swinging pulse to the stepping motor to thereby swing the rotor; detecting an induced voltage generated in the coil when the rotor vibrates; and determining, based on a result of the detection, a mechanical load received by the rotor.

BRIEF DESCRIPTION OF THE DRAWINGS

FIGS. 8A and 8B are diagrams showing an example of a swinging pulse and a driving pulse in the first embodiment.

FIGS. 15A and 15B are diagrams showing an example of a case in which energy for driving a stepping motor is controlled by controlling an output time of a driving pulse in a third embodiment.

FIGS. 16A and 16B are diagrams showing an example of a case in which energy for driving a stepping motor is controlled by controlling an excitation method for the stepping motor in the third embodiment.

FIGS. 17A and 17B are diagrams showing an example of a case in which energy for driving the stepping motor is controlled by controlling a duty ratio of the driving pulse in the third embodiment.

FIGS. 18A and 18B are diagrams showing an example of a case in which energy for driving the stepping motor is controlled by controlling a voltage of the driving pulse in the third embodiment.

DETAILED DESCRIPTION OF THE PREFERRED EMBODIMENTS

Figure 1:
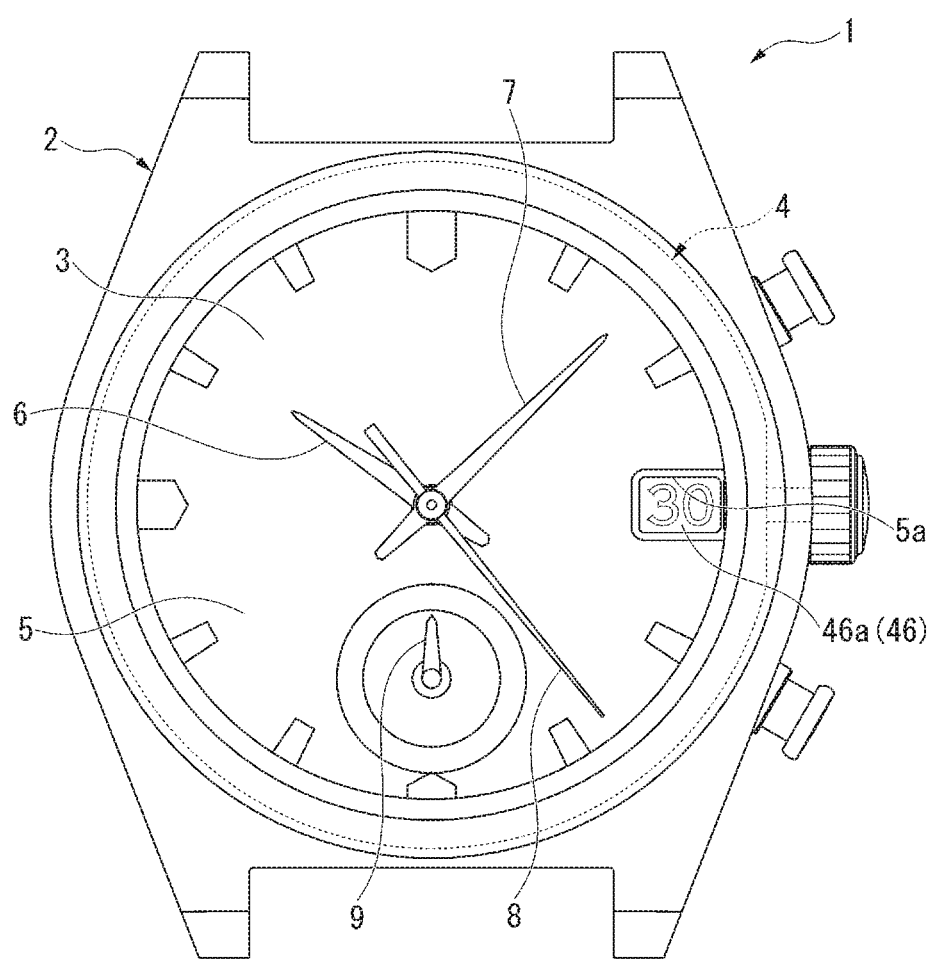
FIG. 1 is an exterior view of a timepiece according to a first embodiment.

Embodiments of the present invention are explained below with reference to the drawings. Note that, in the following explanation, components having the same or similar functions are denoted by the same reference numerals and signs. Redundant explanation of the components is sometimes omitted.

First Embodiment

In general, a machine body including a driving portion of a timepiece is called "movement". A timepiece in a state formed in a completed product by attaching a dial and hands to the movement and placing the movement in a timepiece case is called "complete". Of both sides of a main plate configuring a substrate of the timepiece, a side where glass of the timepiece case is present (that is, a side where the dial is present) is called "rear side" of the movement. Of both the sides of the main plate, a side where a case rear lid of the timepiece case is present (that is, the opposite side of the dial) is called "front side" of the movement.

FIG. 1 is an exterior view of a timepiece according to a first embodiment.

As shown in FIG. 1, a complete of a timepiece 1 in this embodiment includes, in a timepiece case 2 consisting of a not-shown case rear lid and a glass 3, a movement 4 (a movement for timepiece), a dial 5 having an indicator, an hour hand 6 (a hand), a minute hand 7, a second hand 8, and a 24 hours hand 9. In the dial 5, a date window 5a for clearly showing a date character 46a displayed on a date indicator 46 explained below is opened. Consequently, the timepiece 1 makes it possible to check a date in addition to time.

Figure 2:
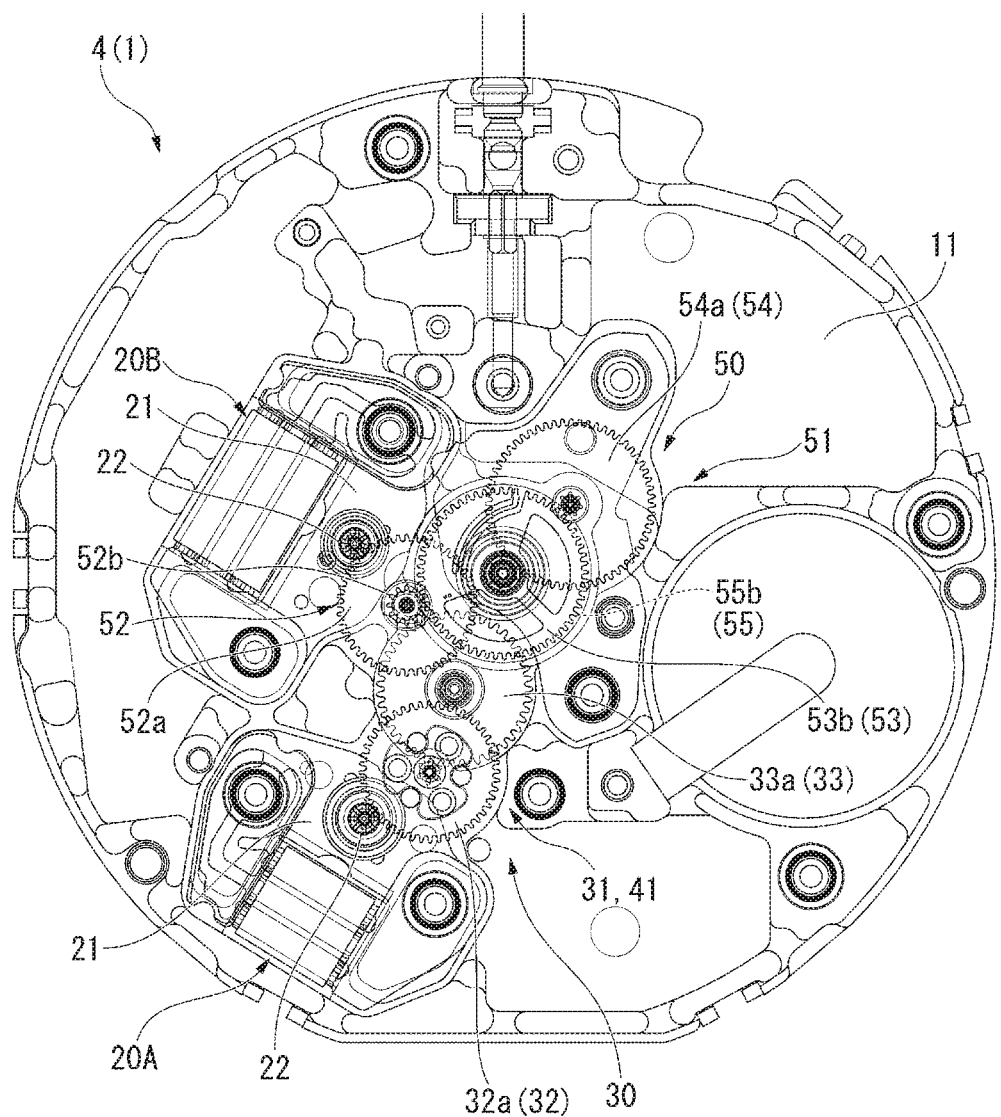
FIG. 2 is a plan view of a movement front side according to the first embodiment.
Figure 3:
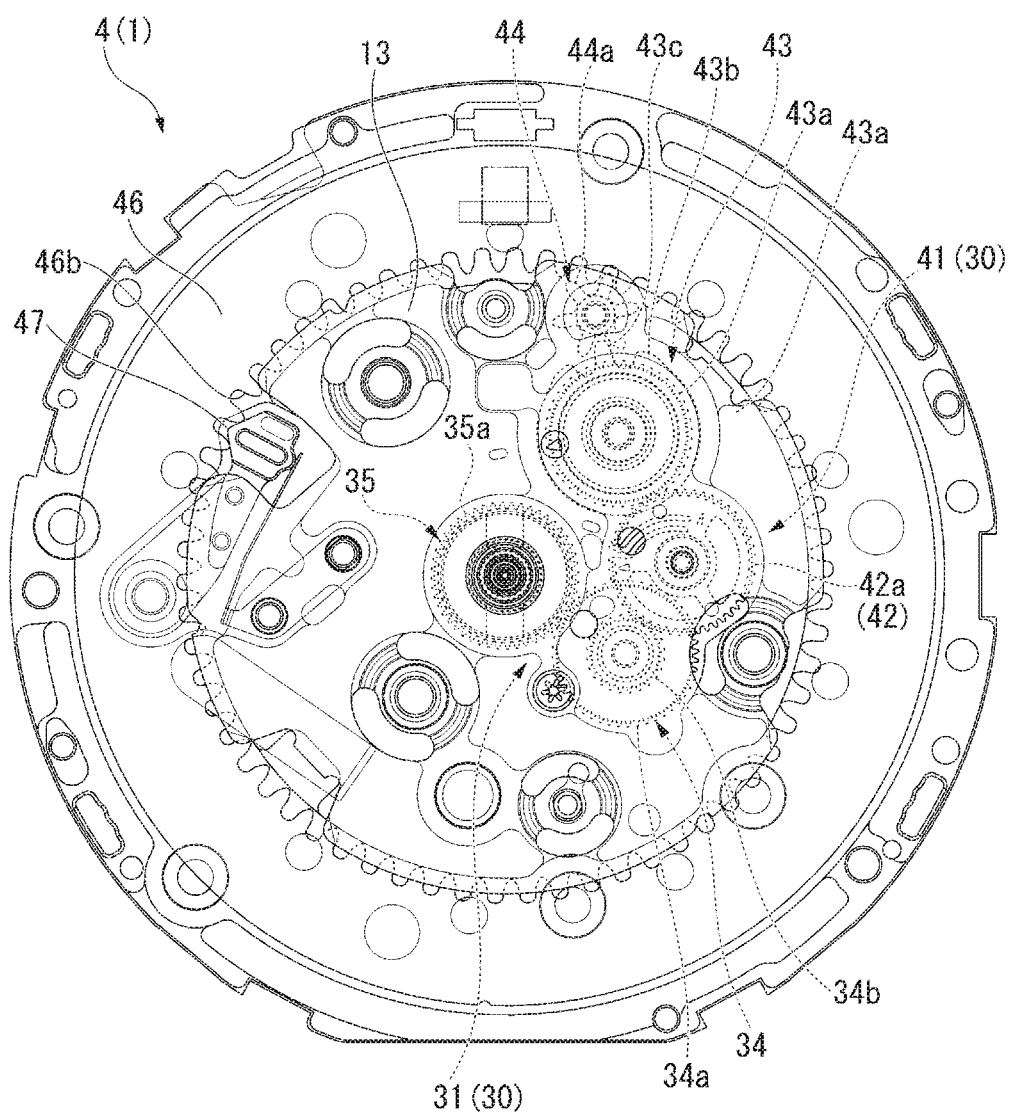
FIG. 3 is a plan view of a movement rear side according to the first embodiment.

FIG. 2 is a plan view of a movement front side according to the first embodiment. FIG. 3 is a plan view of a movement rear side according to the first embodiment.

As shown in FIG. 2 and FIG. 3, the movement 4 includes a main plate 11, a date indicator maintaining plate 13, a first motor 20A, a second motor 20B, a first train wheel group 30, and a second train wheel group 50. The main plate 11 configures a substrate of the movement 4. The date indicator maintaining plate 13 is disposed on the rear side of the main plate 11.

As shown in FIG. 2, the first motor 20A and the second motor 20B are stepping motors respectively including stators 21 and rotors 22. Each of the first motor 20A and the second motor 20B rotates the rotor 22 180° in one step. The first motor 20A generates power for rotating the hour hand 6, the 24 hours hand 9, and the date indicator 46 (for all of which, see FIG. 1). The second motor 20B generates power for rotating the minute hand 7 and the second hand 8 (for both of which, see FIG. 1). Pinions are formed in the rotors 22 of the respective first and second motors 20A and 20B.

Figure 4:
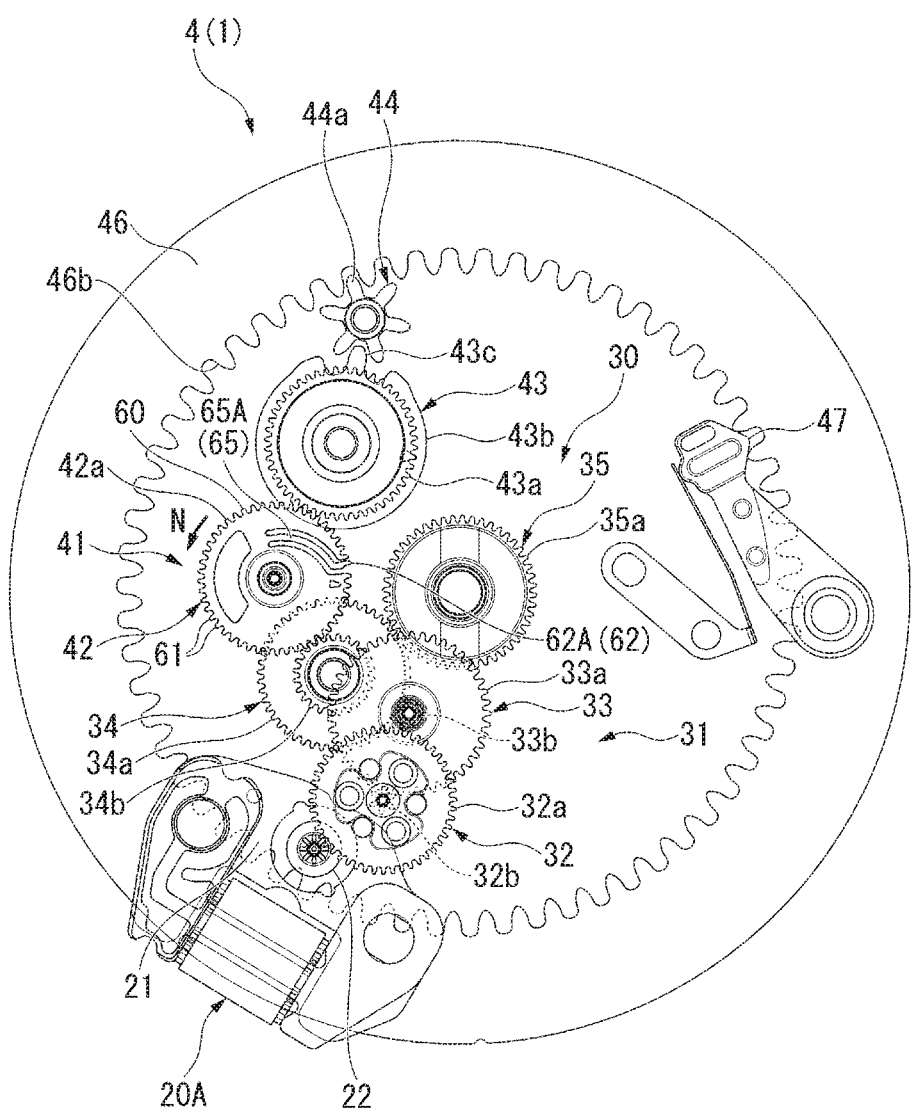
FIG. 4 is a plan view showing a part of a movement according to the first embodiment and is a view of a first train wheel group viewed from a front side.

FIG. 4 is a plan view showing a part of the movement according to the first embodiment and is a view of the first train wheel group viewed from the front side.

As shown in FIG. 3 and FIG. 4, the first train wheel group 30 includes a gear that rotates based on rotation of the rotor 22 of the first motor 20A. The first train wheel group 30 include an hour train wheel 31 that transmits the rotation of the rotor 22 of the first motor 20A to the hour hand 6 and a calendar train wheel 41 that transmits the rotation of the rotor 22 of the first motor 20A to the 24 hours hand 9 (see FIG. 1) and the date indicator 46.

As shown in FIG. 4, the hour train wheel 31 includes a first hour intermediate wheel 32, a second hour intermediate wheel 33, a third hour intermediate wheel 34, and an hour wheel 35.

The first hour intermediate wheel 32 is rotatably supported by the main plate 11 (see FIG. 2). The first hour intermediate wheel 32 includes a first hour intermediate gear 32a and a first hour intermediate pinion 32b. The first hour intermediate gear 32a meshes with the pinion of the rotor 22 of the first motor 20A. The first hour intermediate wheel 32 rotates at a reduction ratio of 6 with respect to the rotor 22. That is, the first hour intermediate wheel 32 rotates once every time the rotor 22 of the first motor 20A rotates six times.

The second hour intermediate wheel 33 is rotatably supported by the main plate 11. The second hour intermediate wheel 33 includes a second hour intermediate gear 33a and a second hour intermediate pinion 33b. The second hour intermediate gear 33a meshes with the first hour intermediate pinion 32b of the first hour intermediate wheel 32. The second hour intermediate wheel 33 is a driven gear that follows the first hour intermediate wheel 32. The second hour intermediate wheel 33 rotates at a reduction ratio of 7.5 with respect to the first hour intermediate wheel 32. That is, the second hour intermediate wheel 33 rotates at a reduction ratio of 45 with respect to the rotor 22 of the first motor 20A.

The third hour intermediate wheel 34 is rotatably supported by the main plate 11. The third hour intermediate wheel 34 includes a third hour intermediate gear 34a and a third hour intermediate pinion 34b (a first gear). The third hour intermediate gear 34a meshes with the second hour intermediate pinion 33b of the second hour intermediate wheel 33. The third hour intermediate wheel 34 is a driven gear that follows the second hour intermediate wheel 33. The third hour intermediate wheel 34 rotates at a reduction ratio of 8 with respect to the second hour intermediate wheel 33. That is, the third hour intermediate wheel 34 rotates at a reduction ratio of 360 with respect to the rotor 22 of the first motor 20A.

The hour wheel 35 is rotatably externally inserted into a center pipe (not shown) held by the main plate 11. The hour wheel 35 is pressed against the date indicator maintaining plate 13 (see FIG. 3) from the rear side via a dial washer. The end portion on the rear side of the hour wheel 35 projects from the date indicator maintaining plate 13 to the rear side. The hour hand 6 (see FIG. 1) is attached to the end portion on the rear side of the hour wheel 35. The hour wheel 35 includes an hour gear 35a. The hour gear 35a meshes with the third hour intermediate gear 34a of the third hour intermediate wheel 34. The hour wheel 35 is a driven gear that follows the third hour intermediate wheel 34. The hour wheel 35 rotates at a reduction ratio of 1 with respect to the third hour intermediate wheel 34. That is, the hour wheel 35 rotates at a reduction ratio of 360 with respect to the rotor 22 of the first motor 20A.

The calendar train wheel 41 includes the first hour intermediate wheel 32, the second hour intermediate wheel 33, and the third hour intermediate wheel 34 explained above, a 24 hours wheel 42, and an intermediate date wheel 43.

The 24 hours wheel 42 is rotatably supported by the main plate 11. A shaft section of the 24 hours wheel 42 projects to the rear side from the date indicator maintaining plate 13. The 24 hours hand 9 (see FIG. 1) is attached to the end portion on the rear side of the shaft section. The 24 hours wheel 42 includes a 24 hours gear 42a (a second gear). The 24 hours gear 42a meshes with the third hour intermediate pinion 34b of the third hour intermediate wheel 34. The 24 hours wheel 42 is a driven wheel that follows the third intermediate wheel 34. The 24 hours wheel 42 rotates at a reduction ratio of 2 with respect to the third hour intermediate wheel 34. That is, the 24 hours wheel 42 rotates at a reduction ratio of 720 with respect to the rotor 22 of the first motor 20A.

The intermediate date wheel 43 is rotatably supported by the main plate 11. The rotation center of the intermediate date wheel 43 is provided in a position shifted by an angle smaller than 180° from the rotation center of the third hour intermediate wheel 34 around the rotation center of the 24 hours wheel 42. That is, the rotation center of the intermediate date wheel 43 is provided in a position deviating from a straight line passing the rotation center of the 24 hours wheel 42 and the rotation center of the third hour intermediate wheel 34 in a plan view. The intermediate date wheel 43 includes an intermediate date gear 43a and a disc wheel 43b. The intermediate date gear 43a meshes with the 24 hours intermediate gear 42a. The intermediate date wheel 43 is a driven wheel that follows the 24 hours wheel 42. The intermediate date wheel 43 rotates at a reduction ratio of 1 with respect to the 24 hours wheel 42. That is, the intermediate date wheel 43 rotates at a reduction ratio of 720 with respect to the rotor 22 of the first motor 20A. The disc wheel 43b overlaps the intermediate date gear 43a. The disc wheel 43b includes feed teeth 43c. The feed teeth 43c projects to the radial direction outer side from the outer circumferential surface of the disc wheel 43b.

A date indicator driving wheel 44 is rotatably supported by the main plate 11. The date indicator driving wheel 44 includes a date indicator driving gear 44a. The date indicator driving gear 44a is formed to be capable of meshing with the feed teeth 43c of the intermediate date wheel 43. The date indicator driving wheel 44 rotates as the feed teeth 43c of the intermediate date wheel 43 enters a rotation track of the date indicator driving gear 44a and meshes with the date indicator driving gear 44a. Therefore, the date indicator driving wheel 44 intermittently rotates according to the rotation of the intermediate date wheel 43. The date indicator driving wheel 44 rotates the date indicator 46.

The date indicator 46 is a ring-like member rotatably attached to the main plate 11. The date indicator 46 is pressed from the rear side by the date indicator maintaining plate 13 (see FIG. 3). The date character 46a (see FIG. 1), which is date information, is displayed on the rear surface of the date indicator 46 along the circumferential direction. The date character 46a is exposed through the date window 5a of the dial 5, whereby the date indicator 46 displays the date information. A plurality of internal teeth 46b are formed at the inner circumferential edge of the date indicator 46 over the entire circumference. The internal teeth 46b mesh with the date indicator driving gear 44a. The date indicator 46 rotates in association with the rotation of the date indicator driving wheel 44. Therefore, the date indicator 46 intermittently rotates according to the rotation of the intermediate date wheel 43. A position in a rotating direction of the date indicator 46 is restricted by a jumper 47. The jumper 47 restricts the rotation of the date indicator 46 by engaging a claw at the distal end of the jumper 47 with the internal teeth 46b of the date indicator 46.

As shown in FIG. 2, the second train wheel group 50 includes a gear that rotates based on the rotation of the rotor 22 of the second motor 20B. The second train wheel group 50 includes a front train wheel 51 that transmits the rotation of the rotor 22 of the second motor 20B to the second hand 8 and the minute hand 7 (for both of which, see FIG. 1). The front train wheel 51 includes an intermediate fourth wheel 52, a fourth wheel and pinion 53, a third wheel and pinion 54, and a center wheel and pinion 55.

The intermediate fourth wheel 52 is rotatably supported by the main plate 11. The intermediate fourth wheel 52 includes an intermediate fourth gear 52a and an intermediate fourth pinion 52b. The intermediate fourth gear 52a meshes with the pinion of the rotor 22 of the second motor 20B. The intermediate fourth wheel 52 rotates at a reduction ratio of 6 with respect to the rotor 22 of the second motor 20B.

The fourth wheel and pinion 53 is disposed to be rotatable with respect to the main plate 11. The fourth wheel and pinion 53 includes a fourth stem (not shown), a fourth gear 53b assembled to the fourth stem, and a fourth pinion (not shown) formed in the fourth stem. The fourth stem is inserted into the inner side of a second stem explained below. The second hand 8 (see FIG. 1) is attached to the end portion on the rear side of the fourth stem. The fourth gear 53b meshes with the intermediate fourth pinion 52b. The fourth wheel and pinion 53 is a driven wheel that follows the intermediate fourth wheel 52. The fourth wheel and pinon 53 rotates at a reduction ratio of 10 with respect to the intermediate fourth wheel 52. That is, the fourth wheel and pinion 53 rotates at a reduction ratio of 60 with respect to the rotor 22 of the second motor 20B.

The third wheel and pinion 54 is rotatably supported by the main plate 11. The third wheel and pinion 54 includes a third gear 54a and a third pinion (not shown). The third gear 54a meshes with the fourth pinion. The third wheel and pinion 54 is a driven gear that follows the fourth wheel and pinion 53. The third wheel and pinion 54 rotates at a reduction ratio of 20 with respect to the fourth wheel and pinion 53. That is, the third wheel and pinion 54 rotates at a reduction ratio of 400 with respect to the rotor 22 of the second motor 20B.

The center wheel and pinion 55 is rotatably supported by a center pipe (not shown). The center wheel and pinion 55 includes a second stem (not shown) and a second gear 55b assembled to the second stem. The second stem is formed in a cylindrical shape and inserted into the inner side of the center pipe. The minute hand 7 (see FIG. 1) is attached to the end portion on the rear side of the second stem. The second gear 55b meshes with the third pinion. The center wheel and pinion 55 is a driven gear that follows the third wheel and pinion 54. The center wheel and pinion 55 rotates at a reduction ratio of 9 with respect to the third wheel and pinion 54. That is, the center wheel and pinion 55 rotates at a reduction ratio of 3600 with respect to the rotor 22 of the motor 20B.

Figure 5:
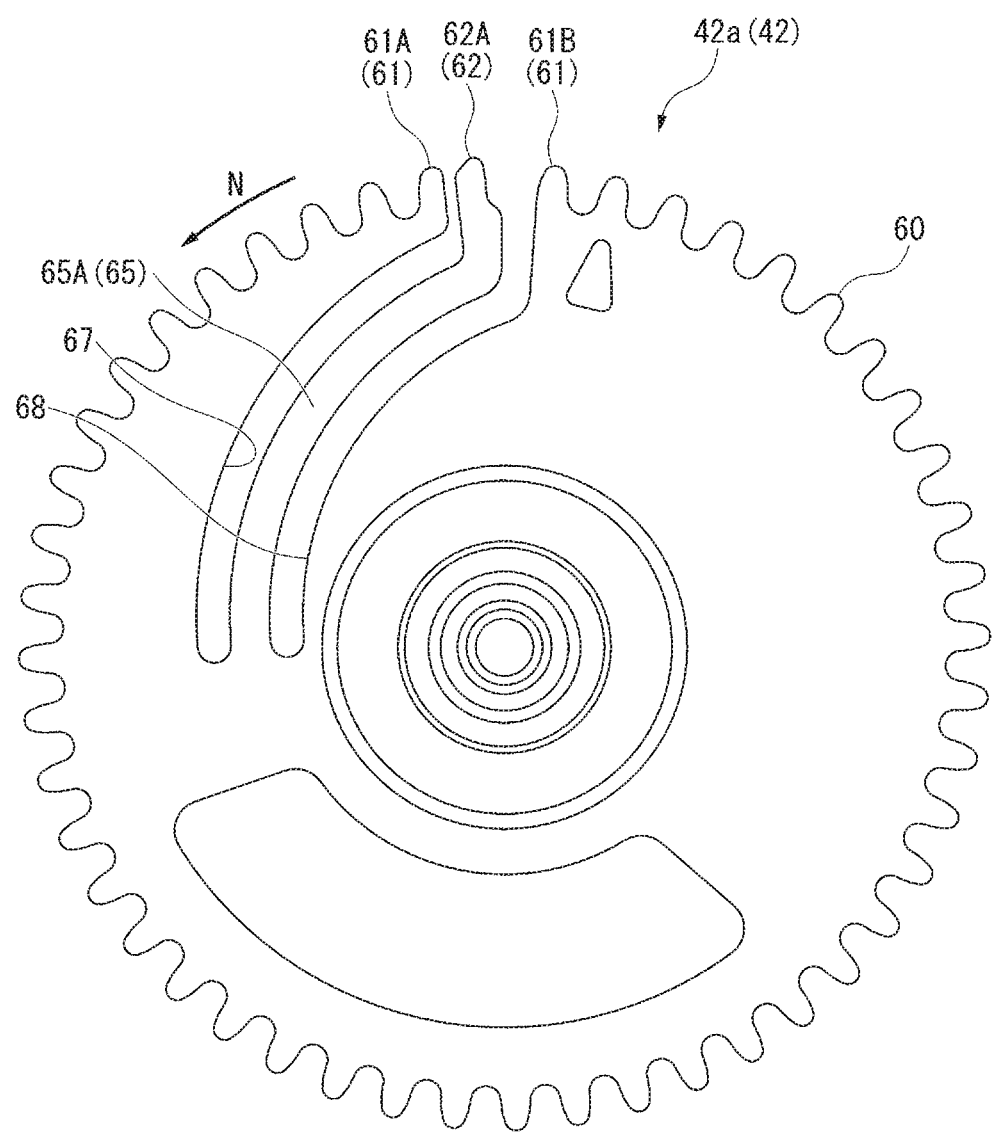
FIG. 5 is a plan view of a 24 hours gear according to the first embodiment.

FIG. 5 is a plan view of the 24 hours gear according to the first embodiment.

As shown in FIG. 5, the 24 hours gear 42a includes a plurality of teeth 60 and elastic sections 65. The plurality of teeth 60 include standard teeth 61 and first load teeth 62A functioning as load teeth 62. The standard teeth 61 are all teeth excluding the first load teeth 62A among the plurality of teeth 60. The standard teeth 61 are teeth of a general gear and are teeth formed in an arcuate tooth shape, an involute tooth shape, a cycloid tooth shape, or the like. Each of the first load teeth 62A is one tooth among the plurality of teeth 60 included in the 24 hours gear 42a. The first load teeth 62A are disposed on one side of the outer circumference of the 24 hours gear 42a such that the first load teeth 62A do not come into contact with the third hour intermediate pinion 34b at an equal interval when the 24 hours gear 42a is rotated. The first load teeth 62A are formed to be elastically displaceable by being supported by the elastic sections 65.

The elastic section 65 is provided for each of the load teeth 62. The elastic section 65 is a cantilever beam including the load tooth 62 at the distal end and elastically deformably formed. The elastic section 65 includes a first elastic section 65A including the first load tooth 62A. The first elastic section 65A is a portion between a first slit 67 and a second slit 68 formed in the 24 hours gear 42a. The first slit 67 extends from one tooth groove adjacent to the first load tooth 62A toward the radial direction inner side and, thereafter, extends toward one side in the circumferential direction. The second slit 68 extends from the other tooth groove adjacent to the first load tooth 62A along the first slit 67. Consequently, the first elastic section 65A extends at substantially fixed width and is elastically deformably formed to displace the first load tooth 62A at the distal end in the radial direction.

A first standard tooth 61A and a second standard tooth 61B among the plurality of standard teeth 61 are defined as follows. The first standard tooth 61A is adjacent to the first load tooth 62A on a downstream side in a normal rotation direction N (a predetermined rotation direction) of the 24 hours gear 42a. The second standard tooth 61B is adjacent to the first load tooth 62A on an upstream side in the normal rotation direction N.

The interval between the first load tooth 62A and the first standard tooth 61A is narrower than the interval between the first load tooth 62A and the second standard tooth 61B. The width of a tooth groove between the first load tooth 62A and the first standard tooth 61A is smaller than the tooth thickness of the teeth of the third hour intermediate pinion 34b. Note that the width of a tooth groove between a pair of teeth 60 adjacent to each other is the distance between the pair of teeth 60 on a pitch circle of the 24 hours gear 42a. The tooth thickness of the teeth 60 is the thickness of the teeth 60 on the pitch circle of the 24 hours gear 42a. Consequently, when the tooth of the third hour intermediate pinion 34b enters the tooth groove between the first load tooth 62A and the first standard tooth 61A, the tooth of the third hour intermediate pinion 34b comes into contact with the first load tooth 62A. The width of a tooth groove between the first load tooth 62A and the second standard tooth 61B is larger than the thickness of the tooth of the third hour intermediate pinion 34b. Consequently, the tooth of the third hour intermediate pinion 34b can enter the tooth groove between the first load tooth 62A and the second standard tooth 61B without coming into contact with the first load tooth 62A.

The action of the load tooth 62 is explained. Note that, in the following explanation, it is assumed that the 24 hours gear 42a is rotating in the normal rotation direction N unless specifically described otherwise. The tooth of the third hour intermediate pinion 34b comes into contact with the teeth 60 of the 24 hours gear 42a from the upstream side in the normal rotation direction N.

When the tooth 60 engaging with the third hour intermediate pinion 34b is replaced with the first standard tooth 61A, the tooth of the third hour intermediate pinion 34b enters the tooth groove between the first standard tooth 61A and the first load tooth 62A. At this time, the tooth of the third hour intermediate pinion 34b comes into contact with the first load tooth 62A before or after the contact with the first standard tooth 61A and elastically displace the first load tooth 62A to expand the width of the tooth groove between the first standard tooth 61A and the first load tooth 62A. Consequently, an energy loss involved in the elastic displacement of the first load tooth 62A occurs in the calendar train wheel 41. Thereafter, when the tooth 60 engaging with the third hour intermediate pinion 34b is replaced with the first load tooth 62A, the first load tooth 62A gradually returns to an initial position. When the tooth 60 engaging with the third hour intermediate pinion 34b is changed to the second standard tooth 61B from the first load tooth 62A, the tooth of the third hour intermediate pinion 34b completely separates from the first load tooth 62A in the tooth groove between the first load tooth 62A and the second standard tooth 61B. The first load tooth 62A returns to the initial position.

As explained above, when the first load tooth 62A of the 24 hours gear 42a comes into contact with the third hour intermediate pinion 34b, an energy loss occurs in the calendar train wheel 41. That is, an energy loss occurs in the calendar train wheel 41 twice every time the 24 hours gear 42a rotates once. When the energy loss occurs in the calendar train wheel 41, a load received by the rotor 22 of the first motor 20A fluctuates. Consequently, the load tooth 62 can give fluctuation to the load received by the rotor 22. Note that the fluctuation of the load given by the load tooth 62 only has to be different from a load at the time when the standard tooth 61 comes into contact with the third hour intermediate pinion 34b. In the following explanation, the load received by the rotor 22 is sometimes referred to as rotation load.

[Functional Configuration of the Timepiece]

Figure 6:
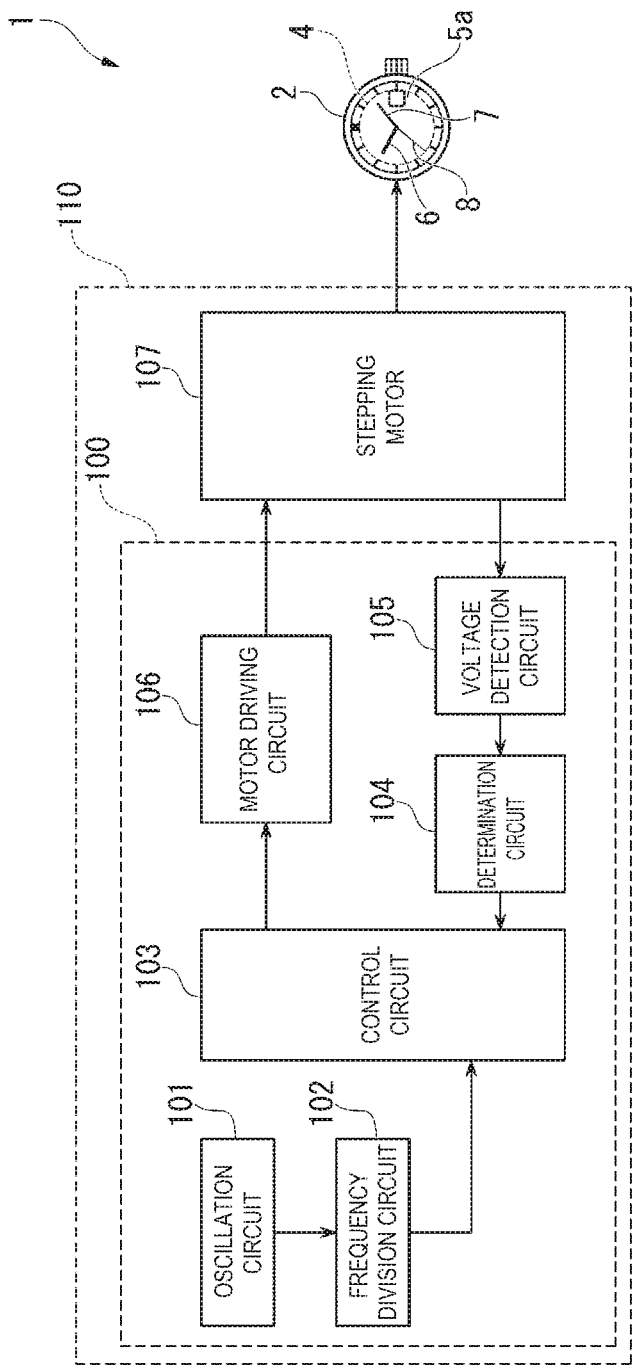
FIG. 6 is a diagram showing an example of a functional configuration of the timepiece according to the first embodiment.

FIG. 6 is a diagram showing an example of a functional configuration of the timepiece according to the first embodiment. A functional configuration of the timepiece 1 is explained with reference to the figure. The timepiece 1 includes an oscillation circuit 101, a frequency division circuit 102, a control circuit (a control unit) 103, a determination circuit (a determining unit) 104, a voltage detection circuit (a voltage detecting unit) 105, a motor driving circuit (a driving unit) 106, a stepping motor 107, the timepiece case 2, the movement 4, the hour hand 6, the minute hand 7, the second hand 8, and the date window 5a.

Hereinafter, the oscillation circuit 101, the frequency division circuit 102, the control circuit 103, the determination circuit 104, the voltage detection circuit 105, and the motor driving circuit 106 are described as stepping motor control circuit (stepping motor control device) 100 as well. The stepping motor control circuit 100 and the stepping motor 107 are described as hand driving unit 110 as well.

The oscillation circuit 101 generates a signal having a predetermined frequency and transmits the generated signal to the frequency division circuit 102. The frequency division circuit 102 performs frequency division of the signal received from the oscillation circuit 101 to generate a clock signal serving as a reference of clocking and transmits the generated clock signal to the control circuit 103. The control circuit 103 transmits control signals to the units of the timepiece 1 and controls operations of the units of the timepiece 1 based on the clock signal and the like received from the frequency division circuit 102.

The motor driving circuit 106 acquires the control signal from the control circuit 103 and drives the stepping motor 107 based on the acquired control signal. The stepping motor 107 is driven by the motor driving circuit 106 and rotates the hour hand 6, the minute hand 7, and the second hand 8 via train wheels.

The voltage detection circuit 105 detects an induced voltage generated in a coil when the stepping motor 107 vibrates. The voltage detection circuit 105 transmits the detected induced voltage to the determination circuit 104.

The determination circuit 104 determines, based on a value of the induced voltage detected by the voltage detection circuit 105, a mechanical load received by a rotor included in the stepping motor 107. For example, the determination circuit 104 determines, based on whether the voltage value detected by the voltage detection circuit 105 exceeds a predetermined threshold, the mechanical load received by the rotor.

[Configuration of the Hand Driving Unit]

Figure 7:
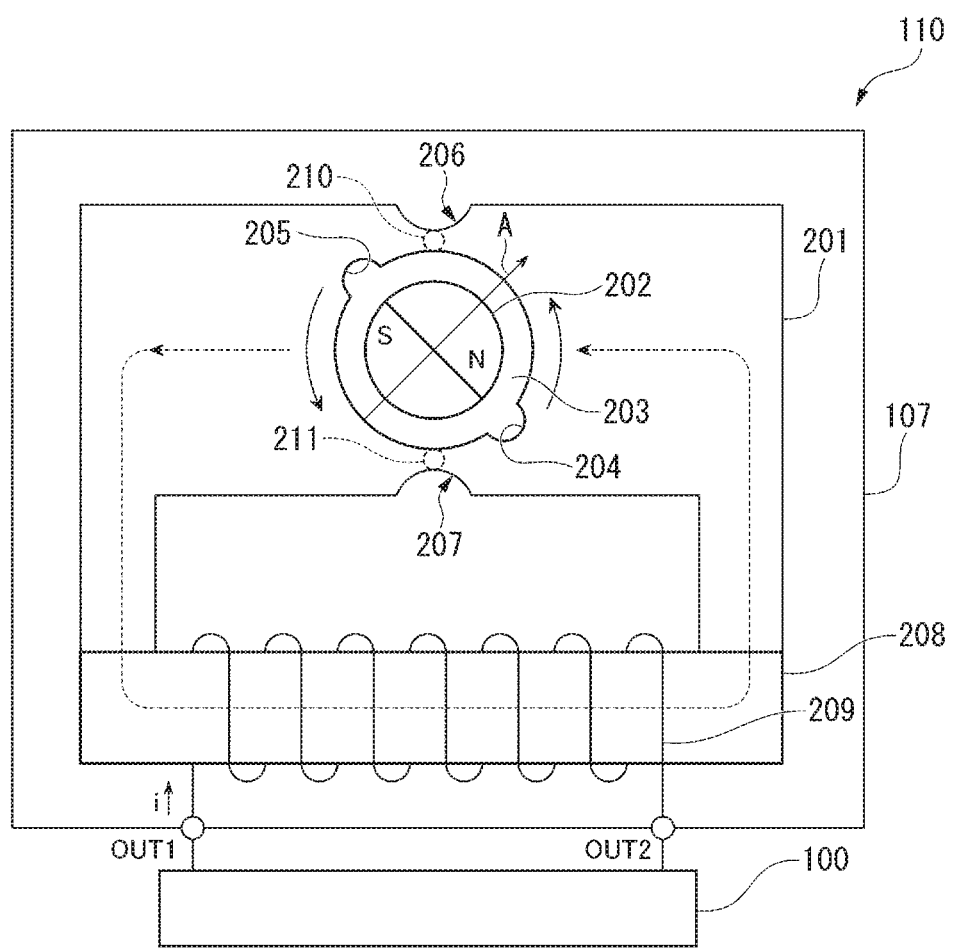
FIG. 7 is a diagram showing an example of a configuration of a hand driving unit according to the first embodiment.

FIG. 7 is a diagram showing an example of a configuration of the hand driving unit 110 according to the first embodiment.

The stepping motor 107 includes a stator 201, a rotor 202, a through-hole for rotor housing 203, an inner notch 204, an inner notch 205, an outer notch 206, an outer notch 207, a magnetic core 208, and a coil 209. Hereinafter, the through-hole for rotor housing 203 is described as a through-hole for rotor as well.

The magnetic core 208 is a member made of a magnetic material and is joined to both ends of the stator 201. The coil 209 is wound around the magnetic core 208. One end of the coil 209 is connected to a terminal OUT1 and the other end of the coil 209 is connected to a terminal OUT2. A driving current i is fed to the coil 209, whereby the coil 209 generates a magnetic flux. The stator 201 is a member made of a magnetic material. The stator 201 gives the magnetic flux generated by the coil 209 to the rotor 202.

The rotor 202 is formed in a columnar shape and is inserted into, in a rotatable state, the through-hole for rotor housing 203 formed in the stator 201. That is, the stepping motor 107 includes the stator 201 in which the through-hole for rotor housing 203 is provided, the rotor 202 rotatably disposed in the through-hole for rotor housing 203, and the coil 209 provided in the stator 201. Since the rotor 202 is magnetized, the rotor 202 has an N pole and an S pole. In the following explanation, an axis from the S pole to the N pole of the rotor 202 is referred to as magnetic pole axis A as well and a direction from the S pole to the N pole of the magnetic pole axis A is referred to as positive direction of the magnetic pole axis A (or simply, a direction of the magnetic pole axis A) as well.

The rotor 202 rotates in a normal rotation direction to thereby rotate a hand 155 clockwise via a train wheel and rotates in a reverse rotation direction to thereby rotate the hand 155 counterclockwise via the train wheel. That is, the rotor 202 rotates the hand 155 in the normal rotation direction for rotating the hand 155 clockwise and in the reverse rotation direction, which is the opposite direction of the normal rotation direction.

The inner notch 204 and the inner notch 205 are cutouts formed on a wall surface of the through-hole for rotor housing 203 and determine a stop position of the rotor 202 with respect to the stator 201. That is, for example, when the coil 209 is not magnetized, the rotor 202 stands still in a position where the magnetic pole axis is orthogonal to a line segment connecting the inner notch 204 and the inner notch 205.

The outer notch 206 and the outer notch 207 are respectively cutouts formed on the inner side and the outer side of the bent stator 201. A saturable section 210 is formed between the outer notch 206 and the through-hole for rotor housing 203. A saturable section 211 is formed between the outer notch 207 and the through-hole for rotor housing 203. The saturable section 210 and the saturable section 211 are portions that are not magnetically saturated by a magnetic flux of the rotor 202 and are magnetically saturated to have large magnetic resistance when the coil 209 is excited.

[Driving of the Stepping Motor]

The motor driving circuit 106 applies a driving pulse between the terminals (the first terminal OUT1 and the second terminal OUT2) of the coil 209 to thereby generate the driving current i.

The stepping motor control device 100 reverses, according to the direction of the magnetic pole axis A in the stop position of the rotor 202, the direction of the driving current i supplied to the coil 209 to thereby rotate the rotor 202 in a fixed direction (for example, the normal rotation direction).

As an example, driving in the normal rotation direction is explained. When the stepping motor control device 100 supplies the driving pulse to between the first terminal OUT1 and the second terminal OUT2 of the coil 209, a magnetic flux is generated in the stator 201. Consequently, the saturable section 210 and the saturable section 211 are saturated and the magnetic resistance increases. Thereafter, the rotor 202 rotates 180 degrees counterclockwise and stably stops according to an interaction between a magnetic pole generated in the stator 201 and a magnetic pole of the rotor 202. According to the approximately 180 degrees rotation, the hand 155 of the timepiece 1 can move by one gradation of a specified amount. A motion of the specified amount is sometimes referred to as one step. Train wheels having appropriate reduction ratios are disposed as appropriate between the rotor 202 and the hand 155 to achieve the motion of the specified amount. In an example in this embodiment, the hand 155 moves by one second according to the motion of one step.

In the case in which the rotor 202 is in a state shown in FIG. 7, when the stepping motor control device 100 supplies the driving pulse to between the first terminal OUT1 and the second terminal OUT2 of the coil 209, an electric current flows to the coil 209. In this example, when a pulse having high potential at the first terminal OUT1 and low potential at the second terminal OUT2 (hereinafter described as positive direction) is applied, an electric current flows in the direction of the driving current i. When the electric current flows to the coil 209, a magnetic flux is generated in the stator 201. The rotor 202 rotates approximately 180 degrees counterclockwise and stably stops with the magnetic flux.

In the case in which the rotor 202 is in a state in which the rotor 202 rotates approximately 180 degrees from the state shown in FIG. 7, when the stepping motor control device 100 applies a pulse having low potential at the first terminal OUT1 and high potential at the second terminal OUT2 (hereinafter described as negative direction), a magnetic flux in the opposite direction of the magnetic flux generated when the positive direction pulse is applied is generated in the stator 201. Consequently, first, the saturable section 210 and the saturable section 211 are saturated. Thereafter, the rotor 202 rotates approximately 180 degrees counterclockwise and stably stops according to an interaction between the magnetic pole generated in the stator 201 and the magnetic pole of the rotor 202. By supplying signals having different polarities (alternating signals) to the coil 209 in this way, the rotor 202 continuously rotates approximately 180 degrees at a time counterclockwise.

[A Swinging Pulse and a Driving Pulse]

FIGS. 8A and 8B are diagrams showing an example of a swinging pulse and a driving pulse in the first embodiment. FIG. 8A is a diagram showing a timing chart for explaining timing when the swinging pulse and the driving pulse are applied. FIG. 8B is a diagram for explaining an angle of the rotor 202. In explanation of FIG. 8A, the horizontal axis indicates time, "Out1" indicates the magnitudes of voltages applied to the first terminal OUT1 at times, and "Out2" indicates the magnitudes of voltages applied to the second terminal OUT2 at the times.

In explanation of FIG. 8B, a rotation position of the rotor 202 is explained assuming that the position of the magnetic pole axis A explained in FIG. 7 is 0 degree and an angle of the magnetic pole axis A rotating counterclockwise is a positive rotation angle. Control at time t11 to time t21 is control for rotating the rotor 202 clockwise from 0 degree to 180 degrees. Control at time t21 to time t29 is control for rotating the rotor 202 clockwise from 180 degrees to 0 degree.

The control circuit 103 outputs the driving pulse to the motor driving circuit 106 to thereby rotate the rotor 202 and outputs the swinging pulse to the motor driving circuit 106 to thereby swing the rotor 202. The swinging pulse and the driving pulse are respectively explained below.

At time t11 to time t12, the stepping motor control device 100 applies a positive direction pulse to the second terminal OUT2. When the positive direction pulse is continuously applied to the second terminal OUT2, the rotor 202 stands still in a position rotated −45 degrees. When the stepping motor control device 100 stops the application of the pulse at time t12, the rotor 202 is pulled back to the position of 0 degree and stands still. When returning to the position of 0 degree from the position of −45 degrees, the rotor 202 rotates to a position of a positive rotation angle counterclockwise and rotates to a position of a negative rotation angle clockwise at least once with inertia. The rotor 202 repeats rotating counterclockwise and rotating clockwise. That is, the rotor 202 vibrates and stands still in the position of 0 degree according to attenuation of the vibration.

Note that the pulse applied at time t11 to time t12 is not a pulse for the purpose of the rotor 202 rotating approximately 180 degrees but is a pulse for the purpose of vibrating the rotor 202 to thereby detect a vibration state of the rotor 202. Hereinafter, the pulse for the purpose of vibrating the rotor 202 is distinguished from a normal driving pulse and described as swinging pulse.

Note that a time in which the swinging pulse is applied only has to be a time enough for the rotor 202 to vibrate. The pulse is not required to be applied until the rotor 202 stands still in a rotation position of −45 degrees.

At time t12 to time t15, the stepping motor control device 100 determines a mechanical load received by the rotor 202 according to the application of the swinging pulse. Specifically, based on a voltage detected by the voltage detection circuit 105, the determination circuit 104 determines the mechanical load received by the rotor 202.

Note that, based on timing when the voltage detection circuit 105 detects a voltage value exceeding a predetermined voltage value decided in advance in addition to the magnitude of the voltage detected by the voltage detection circuit 105 or instead of the magnitude of the voltage detected by the voltage detection circuit 105, the determination circuit 104 may determine the mechanical load received by the rotor 202. For example, based on whether generation timing of the voltage value detected by the voltage detection circuit 105 is within a predetermined period decided in advance, the determination circuit 104 may determine the mechanical load received by the rotor 202.

At time t15 to time t16, the stepping motor control device 100 applies a positive direction pulse to the first terminal OUT1. When the positive direction pulse is continuously applied to the first terminal OUT1, the rotor 202 stands still in a position rotated 135 degrees. When the stepping motor control device 100 stops the application of the pulse at time t16, the rotor 202 is pulled to the position of 180 degrees and stands still. The pulse applied at time t15 to time t16 is a pulse for rotating the rotor 202 approximately 180 degrees and is, therefore, the driving pulse. The driving pulse is output by the control circuit 103. That is, after outputting the swinging pulse, the control circuit 103 outputs the driving pulse after a predetermined period elapses.

Note that a time in which the driving pulse is applied (a pulse width of the driving pulse) only has to be a time enough for the rotor 202 to rotate 180 degrees. The pulse is not required to be applied until the rotor 202 stands still in the rotation position of 135 degrees.

Note that the time in which the driving pulse is applied may be determined according to the mechanical load determined by the determination circuit 104. In that case, the control circuit 103 controls an output time of the driving pulse according to the mechanical load determined by the determination circuit 104.

At time t21 to time t22, the stepping motor control device 100 applies a positive direction pulse, that is, the swinging pulse to the first terminal OUT1. When the positive direction pulse is continuously applied to the first terminal OUT1, the rotor 202 stands still in the position rotated 135 degrees. When the stepping motor control device 100 stops the application of the pulse at time t22, the rotor 202 is pulled back to the position of 180 degrees and stands still. The rotor 202 vibrates when returning from the position of 135 degrees to the position of 180 degrees and stands still in the position of 180 degrees according to attenuation of the vibration.

At time t22 to time t25, the stepping motor control device 100 determines a mechanical load received by the rotor 202 according to the application of the swinging pulse. Specifically, based on the voltage detected by the voltage detection circuit 105, the determination circuit 104 determines the mechanical load received by the rotor 202.

At time t25 to time t26, the stepping motor control device 100 applies a positive direction pulse, that is, the driving pulse to the second terminal OUT2. When the positive direction pulse is continuously applied to the second terminal OUT2, the rotor 202 stands still in a position rotated 315 degrees. When the stepping motor control device 100 stops the application of the pulse at time t26, the rotor 202 is pulled to the position of 0 degree and stands still.

Figure 9:
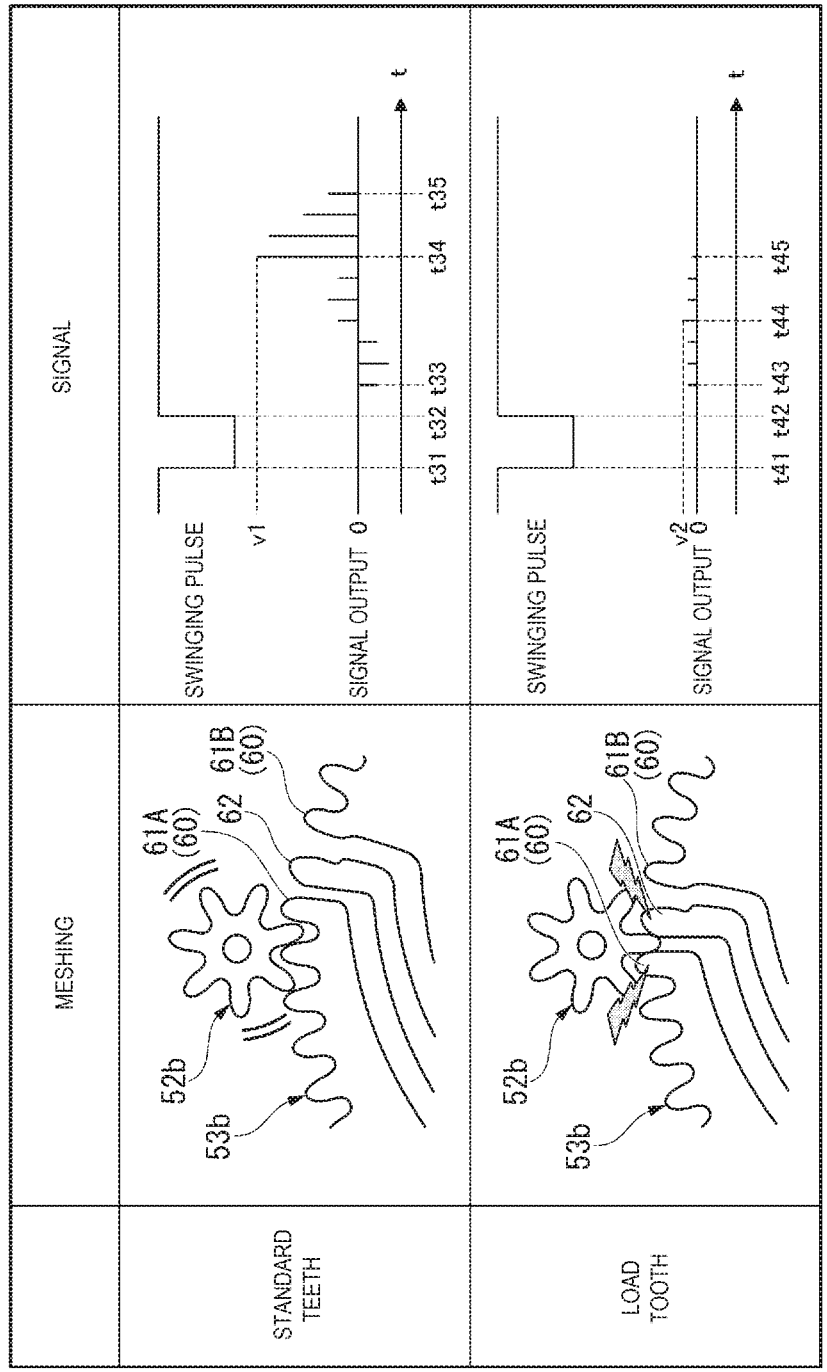
FIG. 9 is a diagram showing an example of vibration in the case in which a load tooth and a pinion mesh with each other and vibration in the case in which standard teeth and the pinion mesh with each other in the first embodiment.

FIG. 9 is a diagram showing an example of vibration in the case in which the load tooth and the pinion mesh with each other and vibration in the case in which the standard teeth and the pinion mesh with each other in the first embodiment. The vibration in the case in which the load tooth and the pinion mesh with each other and the vibration in the case in which the standard teeth and the pinion mesh with each other are explained with reference to the figure.

An upper part of the figure is an example of the case in which the standard teeth and the pinion mesh with each other. A lower part of the figure is an example of the case in which the load tooth and the pinion mesh with each other. Specifically, an example of a case in which the fourth gear 53b including the load tooth 62 and the intermediate fourth pinion 52b mesh with each other is explained. In the explanation in the figure, the fourth gear 53b is sometimes simply described as gear (or second gear) and the intermediate fourth pinion 52b is sometimes simply described as pinion (or first gear). The first gear is a gear that rotates based on the rotation of the rotor 202. The second gear is a gear including the load tooth.

A left side of the figure is a figure showing a state of the meshing of the gear and the pinion. A right side of the figure is a figure showing timing when a swinging pulse is applied and timing when an induced voltage is generated.

First, an example of a case in which the standard teeth 60 and the pinion mesh with each other in the upper part is explained. As shown in the figure on the upper part left side, when the rotor 202 that drives the pinion vibrates according to application of the swinging pulse, the pinion vibrates with the vibration of the rotor 202. A range in which the rotor 202 can vibrate is different depending on the magnitude of a backlash between the gear and the pinion. In a state in which the standard teeth 60 and the pinion mesh with each other, since the backlash is large, the range in which the rotor 202 can vibrate is also wide.

As shown in the figure on the upper part right side, the swinging pulse is applied at time t31 to time t32. The rotor 202 vibrates based on the applied swinging pulse. An induced voltage is generated at time t33 to time t35. In the state in which the standard teeth 60 and the pinion mesh with each other, since the range in which the rotor 202 can vibrate is wide, the generated induced voltage is also large. In the example shown in the figure, a voltage v1 is generated at time t34. The determination circuit 104 determines, as a mechanical load, whether the pinion (the first gear) is in contact with the load tooth of the gear (the second gear).

Subsequently, an example of a case in which the load tooth 62 and the pinion mesh with each other in the lower part is explained. As shown in the figure on the lower part left side, when the rotor 202 that drives the pinion vibrates according to the application of the swinging pulse, the pinion vibrates with the vibration of the rotor 202. However, in a state in which the load tooth 62 and the pinion mesh with each other, since backlash is small, the range in which the rotor 202 can vibrate is also narrow.

As shown in the figure on the lower part right side, the swinging pulse is applied at time t41 to time t42. The rotor 202 vibrates based on the applied swinging pulse. An induced voltage is generated at time t43 to time t45. However, in the state in which the load tooth 62 and the pinion mesh with each other, since the range in which the rotor 202 can vibrate is narrow, the generated induced voltage is also small. In the example shown in the figure, a voltage v2 is generated at time t44. The voltage v2 is smaller compared with the voltage v1.

Note that, whereas vibration is small when the pinion meshes between the load tooth 62 and the first standard tooth 61A, vibration is large when the pinion meshes between the load tooth 62 and the second standard tooth 61B. Both the vibrations and the vibration in the case in which the standard teeth 60 and the pinion mesh with each other may be compared to detect the position of the hand.

Figure 10:
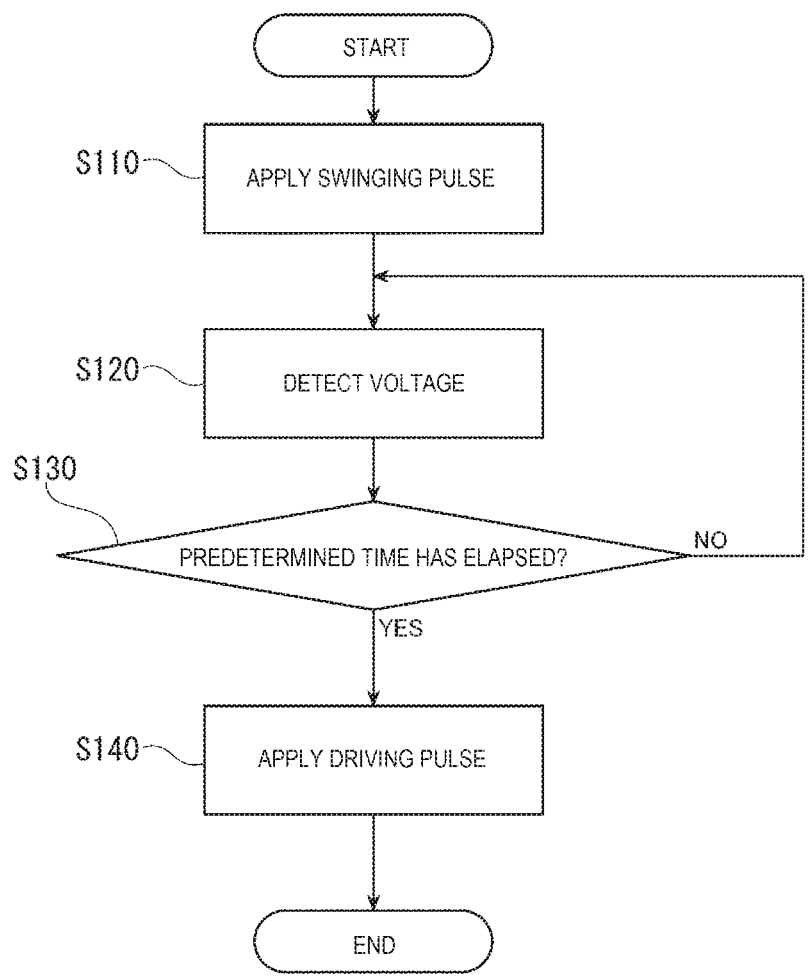
FIG. 10 is a flowchart showing an example of an operation of a stepping motor control device in the first embodiment.

FIG. 10 is a flowchart showing an example of the stepping motor control device 100 in the first embodiment. A series of operations of the stepping motor control device 100 is explained with reference to the figure.

(Step S110) The control circuit 103 outputs a swinging pulse to the motor driving circuit 106. The motor driving circuit 106 drives the stepping motor 107 based on the acquired swinging pulse.

(Step S120) The voltage detection circuit 105 detects an induced voltage due to vibration of the rotor 202. The determination circuit 104 determines a mechanical load of the rotor 202 based on a value of the detected induced voltage or timing when the induced voltage is detected.

(Step S130) When a predetermined time has elapsed from the output of the swinging pulse (step S130; YES), the control circuit 103 advances the processing to step S140. When the predetermined time has not elapsed from the output of the swinging pulse (step S130; NO), the voltage detection circuit 105 repeats step S120.

(Step S140) The control circuit 103 outputs a driving pulse to the motor driving circuit 106. The magnitude (a voltage and a time) of the driving pulse may be a predetermined value decided in advance or may be a value based on the mechanical load of the rotor 202 determined in step S120.

Second Embodiment

Figure 11:
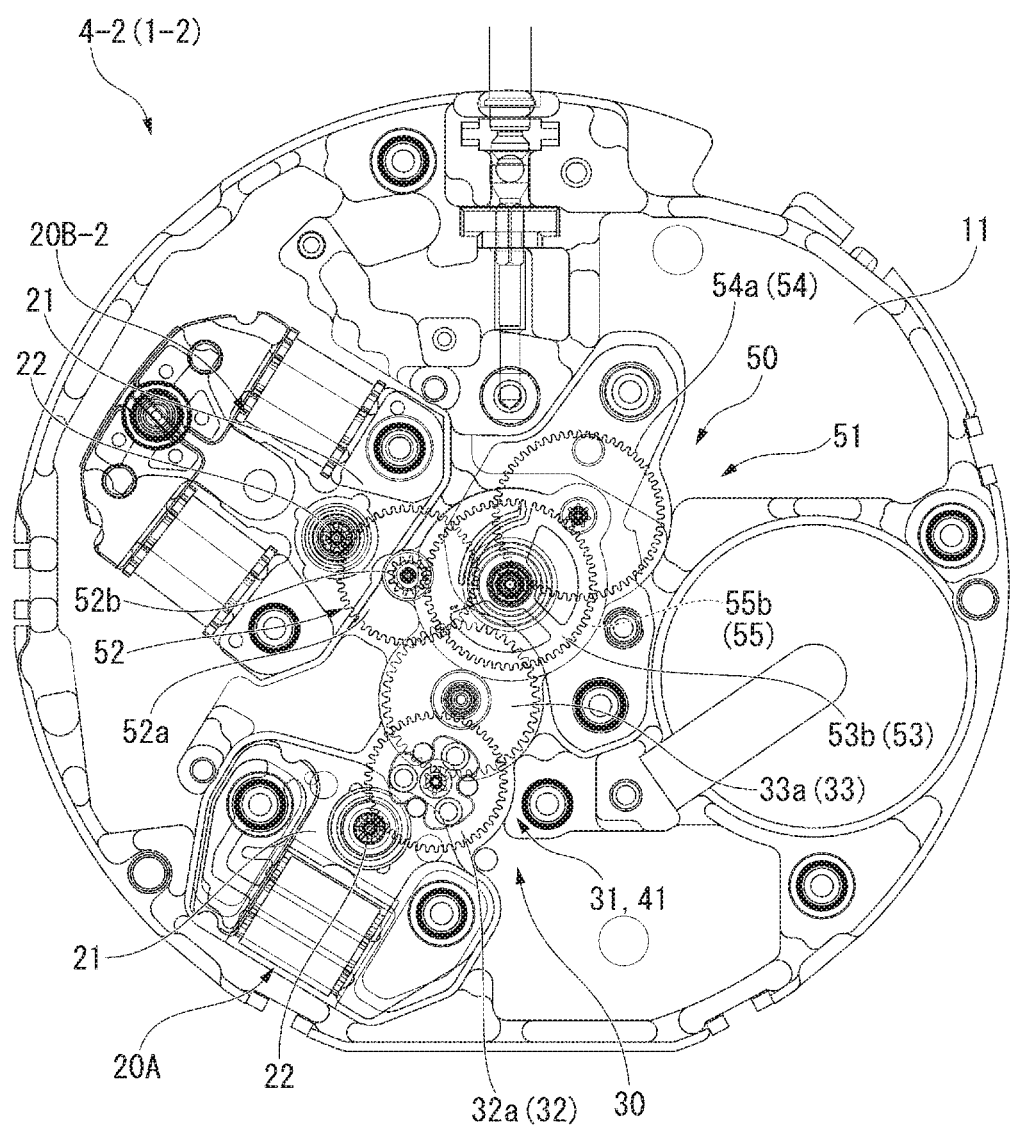
FIG. 11 is a plan view of a movement front side in a second embodiment.

FIG. 11 is a plan view of a movement front side in a second embodiment. The second embodiment is explained with reference to the drawing. A timepiece 1-2 according to the second embodiment is different in that the timepiece 1-2 includes a second motor 20B-2 instead of the second motor 20B in the first embodiment. Whereas the second motor 20B is a one-coil motor, the second motor 20B-2 is a two-coil motor. That is, the second embodiment is an example of a case in which the timepiece 1-2 includes the two-coil motor. Explanation of the same components as the components in the first embodiment is sometimes omitted by adding the same reference numerals and signs as the reference numerals and signs in first embodiment to the components.

Figure 12:
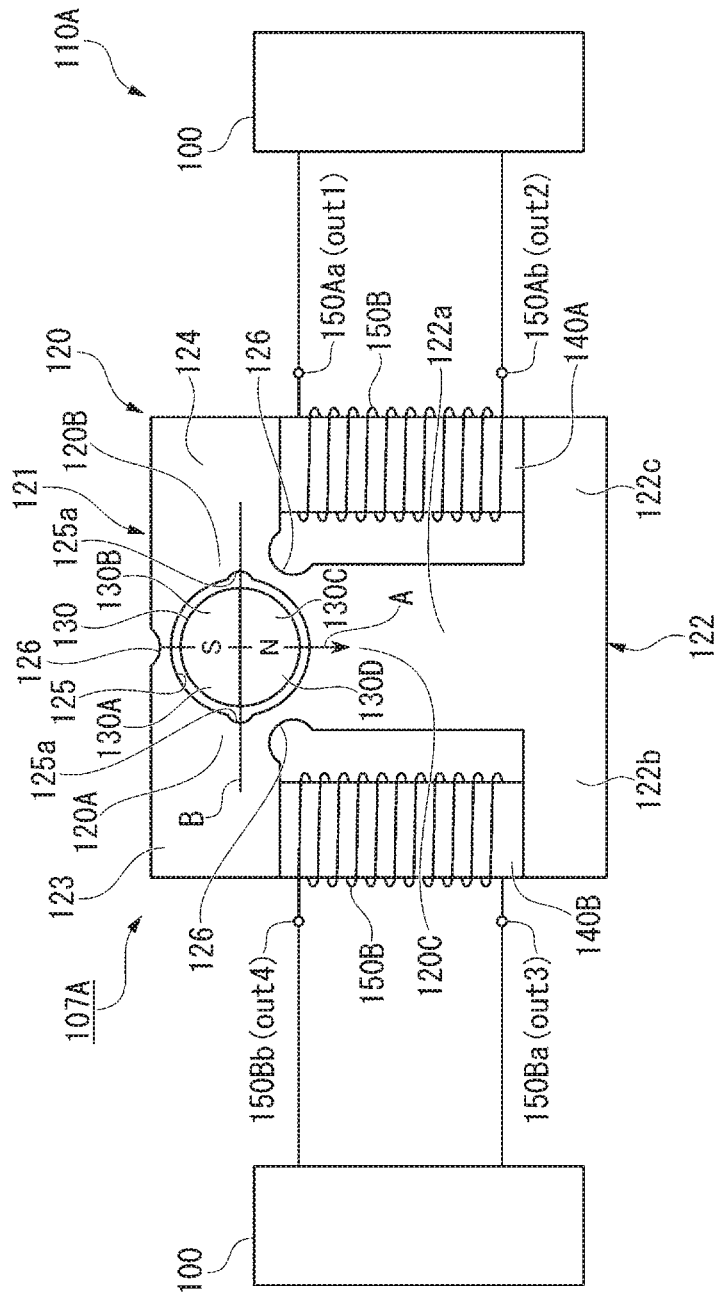
FIG. 12 is a diagram showing an example of a configuration of a hand driving unit in the second embodiment.

FIG. 12 is a diagram showing an example of a configuration of a hand driving unit 110A in the second embodiment.

A stepping motor 107A is an example of a second motor 20B-2. That is, the stepping motor 107A is a two-coil motor. The stepping motor 107A includes a stator 120 including a rotor housing hole 125 and a rotor 130 having magnetic polarity by being magnetized to two poles in the radial direction and rotatably disposed in the rotor housing hole 125. The stepping motor 107A operates in each unit step and rotate a hand.

The stator 120 includes a stator main body 121, a first magnetic core (a first end) 140A magnetically joined to the stator main body 121, a second magnetic core (a second end) 140B, a first coil 150A wound around the first magnetic core 140A, and a second coil 150B wound around the second magnetic core 140B.

The stator main body 121 is formed by a plate material in which a high magnetic permeability material such as a permalloy is used. The stator main body 121 includes a T-shaped first yoke 122 and a pair of a second yoke 123 and a second yoke 124 and is formed in an H shape in a plan view. That is, the T-shaped first yoke 122 includes a linear section 122a extending in a predetermined first direction and a pair of a protruding section 122b and a protruding section 122c protruding from one end portion of the linear section 122a to both sides in a second direction orthogonal to the first direction. The second yoke 123 is provided to protrude from the other end portion of the linear section 122a to the same side as the protruding section 122b. The second yoke 124 is provided to protrude from the other end portion of the linear section 122a to the same side as the protruding section 122c. With such configurations of the first yoke 122, the second yoke 123, and the second yoke 124, the stator main body 121 is formed in the H shape in the plan view. Note that the first yoke 122, the second yoke 123, and the second yoke 124 are integrally formed.

The rotor housing hole 125 having a circular hole shape explained above is formed at an intersection of the first yoke 122, the second yoke 123, and the second yoke 124 of the stator main body 121. On the inner circumferential surface of the rotor housing hole 125, a pair of cutout sections 125a is formed side by side in the second direction to be opposed to each other. The cutout sections 125a are cut out in an arcuate shape. The cutout sections 125a are configured as positioning sections for determining a stop position of the rotor 130. When the rotor 130 is present in a position where a magnetic pole axis of the rotor 130 is orthogonal to a line segment connecting the pair of cutout sections 125a, that is, a position where the magnetic pole axis is along the first direction, the rotor 130 has the lowest potential energy and stably stops. In the following explanation, a stop position of the rotor 130 (a position shown in FIG. 12) at the time when the magnetic pole axis of the rotor 130 is along the first direction and an N pole of the rotor 130 faces the first yoke 122 side is referred to as first stop position. A stop position of the rotor 130 at the time when the magnetic pole axis of the rotor 130 is along the first direction and an S pole of the rotor 130 faces the first yoke 122 side is referred to as second stop position.

Around the rotor housing hole 125 in the stator main body 121, cutout sections 126 cut out from the outer circumferential edge of the stator main body 121 in the plan view toward the rotor housing hole 125 are formed in three places. The cutout sections 126 are formed at a corner portion where the first yoke 122 and the second yoke 123 are connected, a corner portion where the first yoke 122 and the second yoke 124 are connected, and a portion where the second yoke 123 and the second yoke 124 are connected. The cutout sections 126 are cut out in an arcuate shape.

The circumference of the rotor housing hole 125 in the stator main body 121 is locally narrowed by the cutout sections 126 (hereinafter, locally narrowed portions are sometimes referred to as narrow portions). The narrow portions are more easily magnetically saturated compared with the other portions of the stator main body 121. The stator main body 121 is magnetically divided into three around the rotor housing hole 125 by the magnetic saturation of the narrow portions. The stator main body 121 includes a first magnetic pole section 120A disposed in a position corresponding to the second yoke 123 around the rotor 130, a second magnetic pole section 120B disposed in a position corresponding to the second yoke 124 around the rotor 130, and a third magnetic pole section 120C disposed in a position corresponding to the linear portion 122a of the first yoke 122 around the rotor 130.

The sections of the rotor 130 are divided into signs 130A to 130D by the magnetic pole axis A and a straight line B orthogonal to the magnetic pole axis A. In the first magnetic pole section 120A, a portion along the rotor housing hole 125 from the cutout section 126 formed in the portion where the second yoke 123 and the second yoke 124 are connected to the cutout section 125a formed in the second yoke 123 is disposed to be opposed to a portion indicated by the sign 130A of the rotor 130 located in the first stop position (a portion indicated by the sign 130C of the rotor 130 located in the second stop position). In the second magnetic pole section 120B, a portion along the rotor housing hole 125 from the cutout section 126 formed in the portion where the second yoke 123 and the second yoke 124 are connected to the cutout section 125a formed in the second yoke 124 is disposed to be opposed to a portion indicated by the sign 130B of the rotor 130 located in the first stop position (a portion indicated by the sign 130D of the rotor 130 located in the second stop position).

The third magnetic pole section 120C is disposed to be opposed to the N pole of the rotor 130 located in the first stop position (the S pole of the rotor 130 located in the second stop position).

The first magnetic core 140A and the second magnetic core 140B are formed by a high magnetic permeability material such as a permalloy. The first magnetic core 140A is magnetically connected to the distal end portion of the protruding section 122c and the distal end portion of the second yoke 124. The second magnetic pole 140B is magnetically connected to the distal end portion of the protruding section 122b and the distal end portion of the second yoke 123. Both end portions of the first magnetic core 140A and the second magnetic core 140B are coupled to the stator main body 121 by, for example, screwing.

The first coil 150A is wound around the first magnetic core 140A and magnetically joined to the second magnetic pole section 120B and the third magnetic pole section 120C. The first coil 150A includes a first terminal 150Aa and a second terminal 150Ab. The first coil 150A is wound such that, when an electric current is fed from the first terminal 150Aa to the second terminal 150Ab, a magnetic field from the protruding section 122c side toward the second yoke 124 side is generated in the first coil 150A.

The second coil 150B is wound around the second magnetic core 140B and magnetically joined to the first magnetic pole section 120A and the third magnetic pole section 120C. The second coil 150B includes a first terminal 150Ba and a second terminal 150Bb. The second coil 150B is wound such that, when an electric current is fed from the first terminal 150Ba toward the second terminal 150Bb, a magnetic field from the second yoke 123 side toward the protruding section 122b side is generated in the second coil 150B.

A wire diameter of a lead wire of the first coil 150A is the same as a wire diameter of a lead wire of the second coil 150B. The number of times of winding of the first coil 150A is the same as the number of times of winding of the second coil 150B. The terminals of the first coil 150A and the second coil 150B are connected to the stepping motor control device 100. In the following explanation, the potential of the first terminal 150Aa of the first coil 150A is represented as out1, the potential of the second terminal 150Ab of the first coil 150A is represented as out2, the potential of the first terminal 150Ba of the second coil 150B is represented as out3, and the potential of the second terminal 150Bb of the second coil 150B is represented as out4.

In the stator 120 configured in this way, when a magnetic flux is generated from the first coil 150A or the second coil 150B, a magnetic flux flows along the first magnetic core 140A and the second magnetic core 140B and the stator main body 121. The polarities of the first magnetic pole section 120A, the second magnetic pole section 120B, and the third magnetic pole section 120C explained above are switched according to an energization state to the first coil 150A or the second coil 150B.

That is, the stepping motor 107A includes the rotor 130, the stator 120, the first coil 150A, and the second coil 150B. The stator 120 gives a magnetic flux for generating a rotational force to the rotor 130. The rotor 130 is magnetized to at least two poles of the N pole and the S pole and rotates a hand. The first coil 150A supplies a magnetic flux to the first magnetic core 140A of both the ends of the stator 120. The second coil 150B supplies a magnetic flux to the second magnetic core 140B of both the ends of the stator 120.

A driving pulse output by the control circuit 103 energizes the first coil 150A and the second coil 150B to thereby drive the rotor 130 by a reference rotation angle corresponding to the number of poles of the rotor 130.

Note that the reference rotation angle corresponding to the number of poles may be an angle obtained by dividing an angle of one rotation of the rotor 130 by the number of poles to which the rotor is magnetized. For example, when the rotor 130 is magnetized to two poles, the reference rotation angle corresponding to the number of poles is an angle (180°) obtained by dividing the angle of one rotation by 2. When the rotor 130 is magnetized to four poles, the reference rotation angle corresponding to the number of poles is an angle (90°) obtained by dividing the angle of one rotation by 4.

Figure 13:
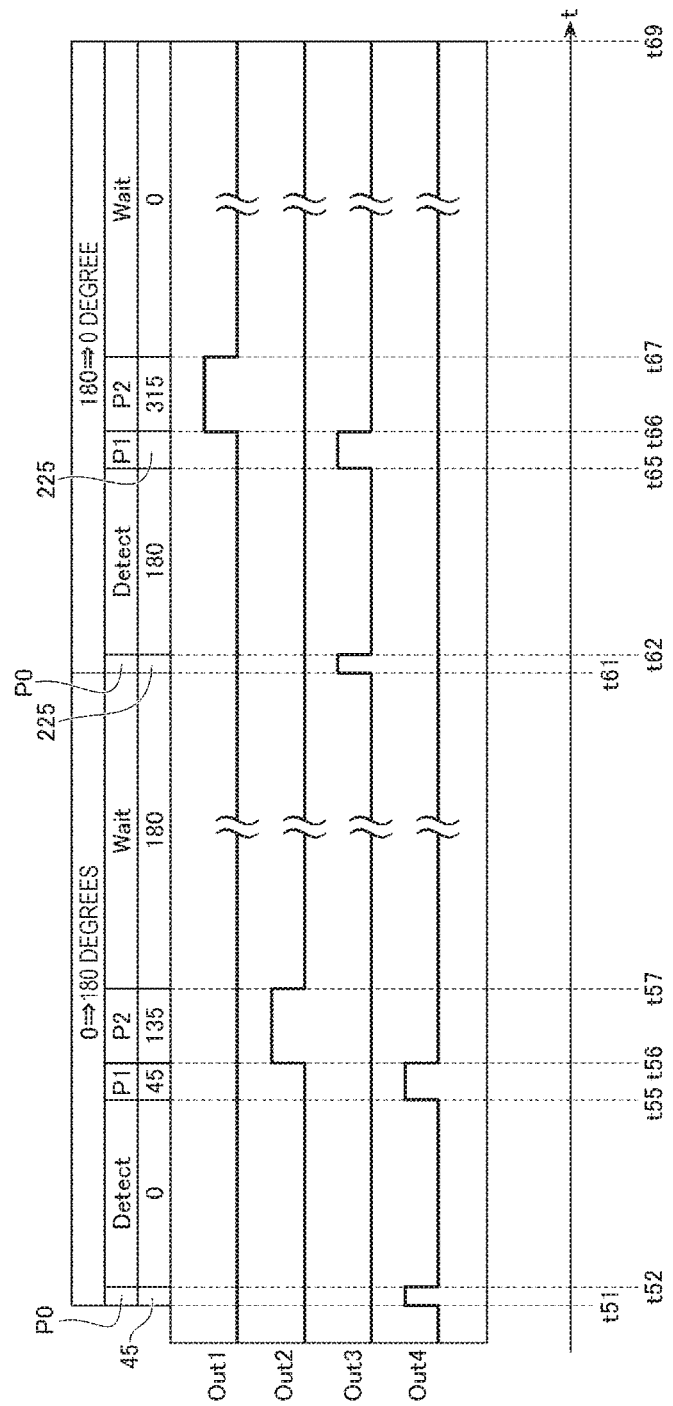
FIG. 13 is a diagram showing an example of a swinging pulse and a driving pulse in the second embodiment.

FIG. 13 is a diagram showing an example of a swinging pulse and a driving pulse in the second embodiment. In the explanation of the figure, the horizontal axis indicates time, "Out1" indicates the magnitudes of voltages applied to the first terminal OUT1 at times, "Out2" indicates the magnitudes of voltages applied to the second terminal OUT2 at the times, "Out3" indicates the magnitudes of voltages applied to the third terminal OUT3 at the times, and "Out4" indicates the magnitudes of voltages applied to the fourth terminal OUT4 at the times.

As the positions of the rotor at the times, a rotation position of the rotor 202 is explained assuming that the second stop position explained in FIG. 12 is 0 degree. Control at time t51 to time t61 is control for rotating the rotor 202 counterclockwise from 0 degree to 180 degrees. Control at time t61 to time t69 is control for rotating the rotor 202 counterclockwise from 180 degrees to 0 degree.

At time t51 to time t52, the stepping motor control device 100 applies a positive direction pulse to the fourth terminal OUT4. When the positive direction pulse is continuously applied to the fourth terminal OUT4, the rotor 130 stands still in a position rotated 45 degrees. When the stepping motor control device 100 stops the application of the pulse at time t52, the rotor 130 is pulled back to the position of 0 degree and stands still. When returning from the position of 45 degrees to the position of 0 degree, the rotor 130 repeats rotating to a position of a negative rotation angle counterclockwise and rotating to a position of a positive rotation angle clockwise at least once with inertia. That is, the rotor 130 vibrates and stands still in the position of 0 degree according to attenuation of the vibration.

At time t52 to time t55, the stepping motor control device 100 determines a mechanical load received by the rotor 130 according to the application of the swinging pulse. Specifically, the determination circuit 104 determines, based on a voltage detected by the voltage detection circuit 105, the mechanical load received by the rotor 130.

At time t55 to time t57, the stepping motor control device 100 applies a driving pulse. The positive direction pulse applied to the fourth terminal OUT4 at time t55 to time t56 is described as first driving pulse. The positive direction pulse applied to the second terminal OUT2 at time t56 to time t57 is described as second driving pulse. When the positive direction pulse is continuously applied to the second terminal OUT2, the rotor 130 stands still in the position rotated 135 degrees. When the stepping motor control device 100 stops the application of the pulse at time t57, the stepping motor control device 100 is pulled to the position of 180 degrees and stands still.

At time t61 to time t62, the stepping motor control device 100 applies the positive direction pulse, that is, the swinging pulse to the third terminal OUT3. When the positive direction pulse is continuously applied to the third terminal OUT3, the rotor 130 stands still in a position rotated 225 degrees. When the stepping motor control device 100 stops the application of the pulse at time t62, the rotor 130 is pulled back to the position of 180 degrees and stands still. The rotor 130 vibrates when returning from the position of 225 degrees to the position of 180 degrees and stands still in the position of 180 degrees according to attenuation of the vibration.

At time t62 to time t65, the stepping motor control device 100 determines a mechanical load received by the rotor 130 according to the application of the swinging pulse. Specifically, the determination circuit 104 determines, based on the voltage detected by the voltage detection circuit 105, the mechanical load received by the rotor 130.

At time t65 to time t67, the stepping motor control device 100 applies the driving pulse. Specifically, the stepping motor control device 100 applies the positive direction pulse to the third terminal OUT3 as the first driving pulse at time t65 to time t66 and applies the positive direction pulse to the first terminal OUT1 as the second driving pulse at time t66 to time t67. When the positive direction pulse is continuously applied to the first terminal OUT1, the rotor 130 stands still in the position rotated 315 degrees. When the stepping motor control device 100 stops the application of the pulse at time t66, the rotor 130 is pulled to the position of 0 degree and stands still.

Figure 14:
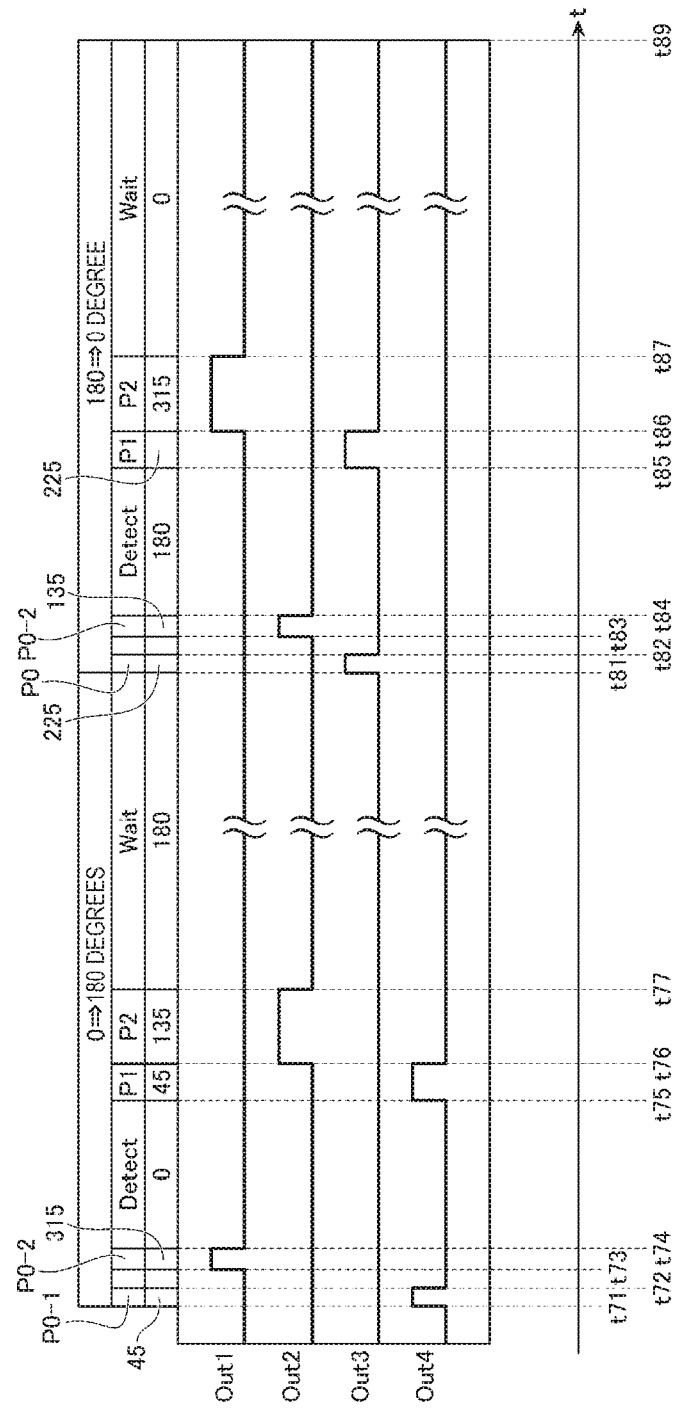
FIG. 14 is a diagram showing a modification of the swinging pulse and the driving pulse in the second embodiment.

FIG. 14 is a diagram showing a modification of the swinging pulse and the driving pulse in the second embodiment. The modification shown in the figure is different from the example explained in FIG. 13 in that the modification includes a swinging pulse (a first swinging pulse) for rotating the rotor 130 a predetermined angle in the normal rotation direction from a stand still position and a swinging pulse (a second swinging pulse) for rotating the rotor 130 a predetermined angle in the reverse rotation direction from the stand still position. In the explanation of the figure, the horizontal axis indicates time, "Out1" indicates the magnitudes of voltages applied to the first terminal OUT1 at times, "Out2" indicates the magnitudes of voltages applied to the second terminal OUT2 at the times, "Out3" indicates the magnitudes of voltages applied to the third terminal OUT3 at the times, and "Out4" indicates the magnitudes of voltages applied to the fourth terminal OUT4 at the times.

As the positions of the rotor at the times, a rotation position of the rotor 202 is explained assuming that the second stop position explained in FIG. 12 is 0 degree. Control at time t51 to time t61 is control for rotating the rotor 202 counterclockwise from 0 degree to 180 degrees. Control at time t61 to time t69 is control for rotating the rotor 202 counterclockwise from 180 degrees to 0 degree.

At time t71 to time t74, the stepping motor control device 100 applies the swinging pulse. Specifically, at time t71 to time t72, the stepping motor control device 100 applies the positive direction pulse (the first swinging pulse) to the fourth terminal OUT4. When the positive direction pulse is applied to the fourth terminal OUT4, the rotor 130 starts rotation toward the position of 45 degrees. When the stepping motor control device 100 stops the application of the pulse at time t72, the rotor 130 starts rotation toward the position of 0 degree. Subsequently, the stepping motor control device 100 applies the positive direction pulse (the second swinging pulse) to the first terminal OUT1. When the positive direction pulse is applied to the first terminal OUT1, the rotor 130 starts rotation toward the position of 315 degrees. Since the rotor 130 is pulled to the position of 315 degrees after being pulled to the position of 45 degrees once, the rotor 130 greatly vibrates with inertia. The rotor 130 stands still in the position of 0 degree according to attenuation of the vibration.

At time t74 to time t75, the stepping motor control device 100 determines a mechanical load received by the rotor 130 according to the application of the swinging pulse. Specifically, the determination circuit 104 determines, based on a voltage detected by the voltage detection circuit 105, the mechanical load received by the rotor 130.

Control at time t75 to time t81 is the same as the control at time t55 to time t61 explained in FIG. 13. Therefore, explanation of the control is omitted.

At time t81 to time t84, the stepping motor control device 100 applies the swinging pulse. Specifically, at time t81 to time t82, the stepping motor control device 100 applies the positive direction pulse (the first swinging pulse) to the third terminal OUT3. When the positive direction pulse is applied to the third terminal OUT3, the rotor 130 starts rotation toward the position of 225 degrees. When the stepping motor control device 100 stops the application of the pulse at time t82, the rotor 130 starts rotation toward the position of 180 degrees. Subsequently, the stepping motor control device 100 applies the positive direction pulse (the second swinging pulse) to the second terminal OUT2. When the positive direction pulse is applied to the second terminal OUT2, the rotor 130 starts rotation toward the position of 135 degrees. Since the rotor 130 is pulled to the position of 135 degrees after being pulled to the position of 225 degrees once, the rotor 130 greatly vibrates with inertia. The rotor 130 stands still in the position of 180 degrees according to attenuation of the vibration.

At time t84 to time t85, the stepping motor control device 100 determines a mechanical load received by the rotor 130 according to the application of the swinging pulse. Specifically, the determination circuit 104 determines, based on the voltage detected by the voltage detection circuit 105, the mechanical load received by the rotor 130.

Control at time t85 to time t89 is the same as the control at time t65 to time t69 explained in FIG. 13. Therefore, explanation of the control is omitted.

Note that, in the example explained in the modification explained above, the control circuit 103 can greatly vibrate the rotor 130 by outputting both of the first swinging pulse for swinging the rotor 130 by outputting a pulse of energy for rotating the rotor 130 in the normal rotation direction and the second swinging pulse for swinging the rotor 130 by outputting a pulse of energy for rotating the rotor 130 in the opposite direction of the normal rotation direction after outputting the first swinging pulse. The control circuit 103 may output only the first swinging pulse as the swinging pulse as in the example in the second embodiment or may output the first swinging pulse and the second swinging pulse as the swinging pulse as in the modification of the second embodiment.

When both of the first swinging pulse and the second swinging pulse are output, the rotor 130 can be greatly vibrated and, on the other hand, a time required for detection sometimes increases. Therefore, when outputting the swinging pulse according to a predetermined cycle at which the driving pulse is output, the control circuit 103 may be configured to output only the first swinging pulse. When outputting the swinging pulse at predetermined timing not corresponding to the predetermined cycle at which the driving pulse is output, the control circuit 103 may be configured to output both of the first swinging pulse and the second swinging pulse.

Note that the control circuit 103 may be configured to have a swinging pulse output mode for outputting the swinging pulse and a swinging pulse non-output mode for not outputting the swinging pulse.

Overview of Effects of the Embodiment

According to the embodiment explained above, by including the control circuit 103 that outputs the driving pulse and the swinging pulse, the voltage detection circuit 105 that detects vibration of the rotor, and the determination circuit 104 that determines, based on a detected voltage, a mechanical load received by the rotor, the stepping motor control device 100 detects the vibration of the rotor at the time when the swinging pulse is output. Therefore, according to this embodiment, even when vibration of the rotor is small depending on a motor, it is possible to vibrate the rotor. Since an induced voltage is generated, it is possible to detect a rotation state of the rotor. It is possible to determine the mechanical load of the rotor.

Conventionally, when a motor configuration is a two-coil motor, since an induced voltage is dispersed to the two coils and an effect of an electromagnetic brake by the coils is intensified, vibration of the rotor in normal driving decreases. However, according to this embodiment, since the swinging pulse for vibrating the rotor is applied, it is possible to surely detect the rotation state of the rotor. It is possible to determine the mechanical load of the rotor.

Depending on a motor, inertial of a rotor is small or a magnetism retention force of a stator is small. In such a case, vibration of the rotor in normal driving decreases. It is difficult to detect a rotation state of the rotor. However, according to this embodiment, since the swinging pulse for vibrating the rotor is applied, it is possible to surely detect the rotation state of the rotor. It is possible to determine the mechanical load of the rotor.

Note that the mechanical load determined by the stepping motor control device 100 is not limited to an example of the case in which the gear includes the load teeth and widely includes a load generated when a date indicator driving gear is rotated.

According to the embodiment explained above, after outputting the swinging pulse, the control circuit 103 outputs the driving pulse after the predetermined period elapses. Therefore, the control circuit 103 outputs the driving pulse after the vibration of the rotor by the swinging pulse is sufficiently attenuated. Therefore, it is possible to prevent the stepping motor from stepping out because of the vibration by the swinging pulse.

Note that the predetermined period from the swinging pulse output to the driving pulse output may be a time sufficient for the vibration of the rotor by the swinging pulse to attenuate and may be decided based on the inertia of the rotor.

According to the embodiment explained above, the stepping motor control device 100 detects, as the mechanical load, the state in which the pinion and the load tooth mesh with each other. Therefore, according to this embodiment, it is possible to specify a reference hand position.

According to the embodiment explained above, the control circuit 103 controls an output time of the driving pulse according to the mechanical load determined by the determination circuit 104. Therefore, when the mechanical load increases, by increasing a time in which the driving pulse is applied (that is, giving large energy), it is possible to prevent the stepping motor from stepping out.

For example, when a calendar is driven, since a load increases, it is suitable to rotate the rotor with energy larger than usual. According to this embodiment, even in such a case, according to a load, it is possible to change energy to be given.

According to the embodiment explained above, the stepping motor control device 100 has the first swinging pulse and the second swinging pulse. When the stepping motor is driven, depending on the speed of driving and the magnitude of a load coupled to the stepping motor, it is suitable to give only the first swinging pulse in some cases or it is suitable to give the first swinging pulse and the second swinging pulse in other cases. According to this embodiment, it is possible to give a suitable swinging pulse according to the speed of the driving of the stepping motor and the magnitude of the load coupled to the stepping motor.

According to the embodiment explained above, in the case of a normal hand operation, the stepping motor control device 100 can suppress misdetection of a mechanical load by applying the first swinging pulse and the second swinging pulse. When driving the hand at high speed, the stepping motor control device 100 can reduce a detection time and drive the hand at high speed by giving only the first swinging pulse.

According to the embodiment explained above, the determination circuit 104 determines the mechanical load based on whether a value of a voltage detected by the voltage detection circuit 105 exceeds a threshold. Therefore, according to this embodiment, it is possible to easily detect a mechanical load of the rotor.

According to the embodiment explained above, after the swinging pulse is given, at timing when an induced voltage would be generated by vibration of the rotor, the determination circuit 104 determines whether an induced voltage is generated. Therefore, according to this embodiment, it is possible to suppress misdetection that occurs when a load temporarily increases because of an external load.

According to the embodiment explained above, the stepping motor control device 100 has the mode for outputting the swinging pulse and the mode for not outputting the swinging pulse. Therefore, according to this embodiment, when the swinging pulse is unnecessary, it is possible to reduce power consumption by not outputting the swinging pulse.

Third Embodiment

Subsequently, a third embodiment is explained with reference to FIG. 15A to FIGS. 18A and 18B. In the embodiment explained above, an example of the case in which the energy of the driving pulse is changed by the stepping motor control device 100 is explained. Specifically, an example of the case in which the control circuit 103 controls the output time of the driving pulse according to the mechanical load determined by the determination circuit 104 to thereby control the energy of the driving pulse is explained. In the third embodiment, a specific example of a case in which energy for driving the stepping motor 107 with various methods is explained.

Note that, in an example explained with reference to FIG. 15A to FIG. 18B, an example of a case in which the stepping motor is a two-coil motor is explained. However, the third embodiment is not limited to the example of the two-coil motor. Even when the timepiece 1 includes a one-coil motor instead of the two-coil motor, it is possible to apply the same processing as processing explained below.

FIGS. 15A and 15B are diagrams showing an example of a case in which energy for driving the stepping motor is controlled by controlling an output time of a driving pulse in the third embodiment. The example of the case in which energy for driving the stepping motor is controlled by controlling the output time of the driving pulse is explained with reference to the figure. FIG. 15A shows an example of a case in which induced voltage detection is successfully performed. FIG. 15B shows an example of a case in which induced voltage detection is not successfully performed.

In the explanation of FIGS. 15A and 15B, the horizontal axis indicates time, "Out1" indicates the magnitudes of voltages applied to the first terminal OUT1 at times, "Out2" indicates the magnitudes of voltages applied to the second terminal OUT2 at the times, "Out3" indicates the magnitudes of voltages applied to the third terminal OUT3 at the times, and "Out4" indicates the magnitudes of voltages applied to the fourth terminal OUT4 at the times.

First, the example of the case in which the induced voltage detection is successfully performed is explained with reference to FIG. 15A.

At time t111, the stepping motor control device 100 controls "Out4" to thereby apply a swinging pulse to the stepping motor 107. The stepping motor control device 100 determines a mechanical load received by the rotor 130 according to the application of the swinging pulse. The voltage detection circuit 105 detects an inducted voltage generated at "Out4". The determination circuit 104 determines, based on a voltage detected by the voltage detection circuit 105, the mechanical load received by the rotor 130. Specifically, since the induced voltage is equal to or larger than a predetermined threshold TH, the determination circuit 104 determines that the induced voltage is normally successfully detected.

Subsequently, the example of the case in which the induced voltage detection is not successfully performed is explained with reference to FIG. 15B.

At time t121, the stepping motor control device 100 controls "Out4" to thereby apply a swinging pulse to the stepping motor 107. The stepping motor control device 100 determines a mechanical load received by the rotor 130 according to the application of the swinging pulse. The voltage detection circuit 105 detects an induced voltage generated at "Out4". Since the induced voltage is equal to or smaller than the predetermined threshold TH, the determination circuit 104 determines that the induced voltage is not normally successfully detected. In this case, the control circuit 103 controls an output time of a driving pulse to thereby control energy for driving the stepping motor 107. Specifically, the control circuit 103 controls an output time of a driving pulse applied at "Out1" at time 125 and an output time of a driving pulse applied at "Out3" at time 127 to be long to thereby control the energy for driving the stepping motor 107 to be large.

FIGS. 16A and 16B are diagrams showing an example of a case in which energy for driving the stepping motor is controlled by controlling an excitation method for the stepping motor in the third embodiment. The example of the case in which energy for driving the stepping motor is controlled by controlling an excitation method for the stepping motor is explained with reference to the figure. FIG. 16A shows an example of a case in which induced voltage detection is successfully performed. FIG. 16B shows an example of a case in which induced voltage detection is not successfully performed.

In the explanation of FIGS. 16A and 16B, the horizontal axis indicates time, "Out1" indicates the magnitudes of voltages applied to the first terminal OUT1 at times, "Out2" indicates the magnitudes of voltages applied to the second terminal OUT2 at the times, "Out3" indicates the magnitudes of voltages applied to the third terminal OUT3 at the times, and "Out4" indicates the magnitudes of voltages applied to the fourth terminal OUT4 at the times.

Subsequently, the example of the case in which the induced voltage detection is successfully performed is explained with reference to FIG. 16A.

At time t211, the stepping motor control device 100 controls "Out4" to thereby apply a swinging pulse to the stepping motor 107. The stepping motor control device 100 determines a mechanical load received by the rotor 130 according to the application of the swinging pulse. The voltage detection circuit 105 detects an induced voltage generated at "Out4". The determination circuit 104 determines, based on a voltage detected by the voltage detection circuit 105, the mechanical load received by the rotor 130. Specifically, since the induced voltage is equal to or larger than the predetermined threshold TH, the determination circuit 104 determines that the induced voltage is normally successfully detected.

In the example shown in FIG. 16A, the control circuit 103 controls the stepping motor 107 according to one-phase excitation.

Subsequently, the example of the case in which the induced voltage detection is not successfully performed is explained with reference to FIG. 16B.

At time t221, the stepping motor control device 100 controls "Out4" to thereby apply a swinging pulse to the stepping motor 107. The stepping motor control device 100 determines a mechanical load received by the rotor 130 according to the application of the swinging pulse. The voltage detection circuit 105 detects an induced voltage generated at "Out4". Since the induced voltage is equal to or smaller than the predetermined threshold TH, the determination circuit 104 determines that the induced voltage is not normally successfully detected. In this case, the control circuit 103 controls an excitation method for the stepping motor 107 to thereby control energy for driving the stepping motor 107. Specifically, the control circuit 103 controls the excitation method for the stepping motor 107 from one-phase excitation to two-phase excitation to thereby control the energy for driving the stepping motor 107. More specifically, the control circuit 103 applies "Out1" and "Out3" at time 225 and applies "Out3" only at time 227 to thereby perform two-phase excitation driving and controls the energy for driving the stepping motor 107 to be large.

FIGS. 17A and 17B are diagrams showing an example of a case in which energy for driving the stepping motor is controlled by controlling a duty ratio of a driving pulse in the third embodiment. The example of the case in which energy for driving the stepping motor is controlled by controlling a duty ratio of a driving pulse is explained with reference to the figure. FIG. 17A shows an example of a case in which induced voltage detection is successfully performed. FIG. 17B shows an example of a case in which induced voltage detection is not successfully performed.

Note that, in the example shown in the figure, the control circuit 103 controls the stepping motor 107 by applying a PWM signal as a driving pulse.

In the explanation of FIGS. 17A and 17B, the horizontal axis indicates time, "Out1" indicates the magnitudes of voltages applied to the first terminal OUT1 at times, "Out2" indicates the magnitudes of voltages applied to the second terminal OUT2 at the times, "Out3" indicates the magnitudes of voltages applied to the third terminal OUT3 at the times, and "Out4" indicates the magnitudes of voltages applied to the fourth terminal OUT4 at the times.

Subsequently, the example of the case in which the induced voltage detection is successfully performed is explained with reference to FIG. 17A.

At time t311, the stepping motor control device 100 controls "Out4" to thereby apply a swinging pulse to the stepping motor 107. The stepping motor control device 100 determines a mechanical load received by the rotor 130 according to the application of the swinging pulse. The voltage detection circuit 105 detects an induced voltage generated at "Out4". The determination circuit 104 determines, based on a voltage detected by the voltage detection circuit 105, the mechanical load received by the rotor 130. Specifically, since the induced voltage is equal to or larger than the predetermined threshold TH, the determination circuit 104 determines that the induced voltage is normally successfully detected.

In the example shown in FIG. 17A, at time 315 and time 317, the control circuit 103 applies the PWM signal as the driving pulse to thereby control the stepping motor 107.

Subsequently, the example of the case in which the induced voltage detection is not successfully performed is explained with reference to FIG. 17B.

At time t321, the stepping motor control device 100 controls "Out4" to thereby apply a swinging pulse to the stepping motor 107. The stepping motor control device 100 determines a mechanical load received by the rotor 130 according to the application of the swinging pulse. The voltage detection circuit 105 detects an induced voltage generated at "Out4". Since the induced voltage is equal to or smaller than the predetermined threshold TH, the determination circuit 104 determines that the induced voltage is not normally successfully detected. In this case, the control circuit 103 controls a duty ratio of a driving pulse to thereby control energy for driving the stepping motor 107. Specifically, the control circuit 103 sets a duty ratio of a driving pulse applied at time 325 and time 327 larger than a duty ratio of a driving pulse applied at time 315 and time 317 to thereby control the energy for driving the stepping motor 107 to be large.

FIGS. 18A and 18B are diagrams showing an example of a case in which energy for driving the stepping motor is controlled by controlling a voltage of a driving pulse in the third embodiment. The example of the case in which energy for driving the stepping motor is controlled by controlling a duty ratio of a driving pulse is explained with reference to the figure. FIG. 18A shows an example of a case in which induced voltage detection is successfully performed. FIG. 18B shows an example of a case in which induced voltage detection is not successfully performed.

Note that, in this embodiment, the motor driving circuit 106 includes a not shown voltage converter such as a DC/DC converter or an LDO (Low Dropout) and has a configuration capable of selecting a voltage applied to the stepping motor 107.

In the example of FIGS. 18A and 18B, the horizontal axis indicates time, "Out1" indicates the magnitudes of voltages applied to the first terminal OUT1 at times, "Out2" indicates the magnitudes of voltages applied to the second terminal OUT2 at the times, "Out3" indicates the magnitudes of voltages applied to the third terminal OUT3 at the times, and "Out4" indicates the magnitudes of voltages applied to the fourth terminal OUT4 at the times.

Subsequently, the example of the case in which the induced voltage detection is successfully performed is explained with reference to FIG. 18A.

At time t411, the stepping motor control device 100 controls "Out4" to thereby apply a swinging pulse to the stepping motor 107. The stepping motor control device 100 determines a mechanical load received by the rotor 130 according to the application of the swinging pulse. The voltage detection circuit 105 detects an induced voltage generated at "Out4". The determination circuit 104 determines, based on a voltage detected by the voltage detection circuit 105, the mechanical load received by the rotor 130. Specifically, since the induced voltage is equal to or larger than the predetermined threshold TH, the determination circuit 104 determines that the induced voltage is normally successfully detected.

In the example shown in FIG. 17A, at time 415 and time 417, the control circuit 103 applies a voltage V1 as a driving pulse to thereby control the stepping motor 107.

Subsequently, the example of the case in which the induced voltage detection is not successfully performed is explained with reference to FIG. 18B.

At time t421, the stepping motor control device 100 controls "Out4" to thereby apply a swinging pulse to the stepping motor 107. The stepping motor control device 100 determines a mechanical load received by the rotor 130 according to the application of the swinging pulse. The voltage detection circuit 105 detects an induced voltage generated at "Out4". Since the induced voltage is equal to or smaller than the predetermined threshold TH, the determination circuit 104 determines that the induced voltage is not normally successfully detected. In this case, the control circuit 103 controls a voltage of a driving pulse to thereby control energy for driving the stepping motor 107. Specifically, the control circuit 103 sets the voltage of the driving pulse applied at time 415 and time 417 to a voltage V2 larger than the voltage V1 to thereby control the energy for driving the stepping motor 107 to be large.

For example, the voltage V1 may be a voltage generated by the voltage converter and the voltage V2 may be a power supply voltage of a battery.

Overview of Effects of the Third Embodiment

According to the embodiment explained above, by including the control circuit 103, the stepping motor control device 100 controls the energy for driving the stepping motor 107 according to the mechanical load determined by the determination circuit 104. Therefore, according to this embodiment, when the mechanical load increases, by increasing the energy for driving the stepping motor 107, it is possible to prevent the stepping motor from stepping out.

According to the embodiment explained above, when it is determined by the determination circuit 104 that an induced voltage is not normally successfully detected, the control circuit 103 controls the output time of the driving pulse to thereby control the energy for driving the stepping motor 107. Since the control circuit 103 controls the output time of the driving pulse to thereby control the energy for driving the stepping motor 107, it is possible to easily control the energy for driving the stepping motor 107 without using new hardware for changing the energy.

According to the embodiment explained above, when it is determined by the determination circuit 104 that an induced voltage is not normally successfully detected, the control circuit 103 controls the excitation method for the stepping motor 107 to thereby control the energy for driving the stepping motor 107. Since the control circuit 103 controls the excitation method for the stepping motor 107 to thereby control the energy for driving the stepping motor 107, it is possible to easily control the energy for driving the stepping motor 107 without using new hardware for changing the energy. The control circuit 103 can surely control the energy for driving the stepping motor 107.

According to the embodiment explained above, when it is determined by the determination circuit 104 that an induced voltage is not normally successfully detected, the control circuit 103 controls the duty ratio of the driving pulse to thereby control the energy for driving the stepping motor 107. Since the control circuit 103 controls the duty ratio of the driving pulse to thereby control the energy for driving the stepping motor 107, even when the driving pulse is PWM-driven, it is possible to control the energy for driving the stepping motor 107.

According to the embodiment explained above, when it is determined by the determination circuit 104 that an induced voltage is not normally successfully detected, the control circuit 103 controls the voltage of the driving pulse to thereby control the energy for driving the stepping motor 107. Since the control circuit 103 controls the voltage of the driving pulse to thereby control the energy for driving the stepping motor 107, even when there is a temporal limitation of a time in which the driving pulse can be applied, it is possible to control the energy for driving the stepping motor 107.

Note that, in this embodiment, the methods explained above can be combined. For example, both of the application time and the voltage of the driving pulse may be controlled to be simultaneously changed or both of the duty ratio and the voltage of the PWM may be controlled to be simultaneously changed. When the one-phase excitation is changed to the two-phase excitation, at least one of the application time and the voltage of the driving pulse may be controlled to be simultaneously changed.

By combining these methods, it is possible to control the energy for driving the stepping motor 107 with higher resolution.

Fourth Embodiment

Subsequently, a fourth embodiment is explained with reference to FIG. 19. In the embodiment explained above, the modification of the swinging pulse is explained with reference to FIG. 14. In the fourth embodiment, the modification of the swinging pulse explained with reference to FIG. 14 is supplementally explained.

Figure 19:
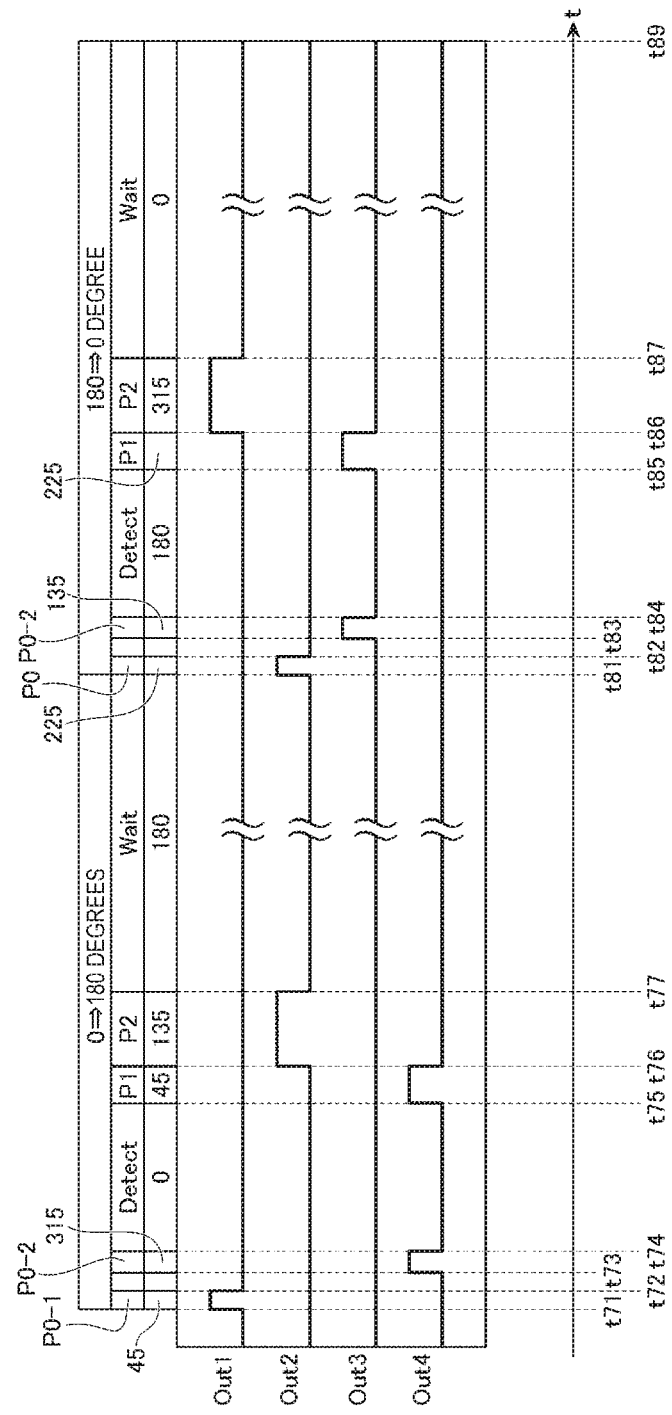
FIG. 19 is a diagram showing an example of a swinging pulse and a driving pulse in a fourth embodiment.

FIG. 19 is a diagram showing an example of a swinging pulse and a driving pulse in the fourth embodiment. An example explained with reference to the figure is different from the example explained with reference to FIG. 14 in that a rotation direction of the swinging pulse is not limited.

In the example explained with reference to FIG. 14, after the rotor 130 is rotated in the normal rotation direction by the first swinging pulse, the rotor 130 is rotated in the reverse rotation direction by the second swinging pulse. However, in this embodiment, after the rotor 130 is rotated in the reverse rotation direction by the first swinging pulse, the rotor 130 may be rotated in the normal rotation direction by the second swinging pulse.

This embodiment is not different from the example explained with reference to FIG. 14 in that the swinging pulse is the first swinging pulse or the second swinging pulse. However, this embodiment is different from the example explained with reference to FIG. 14 in that a rotation direction of the first swinging pulse or the second swinging pulse is not limited. That is, the first swinging pulse has energy for rotating the rotor 130 in a first rotation direction and swings the rotor 130. The second swinging pulse is a swinging pulse applied after the first swinging pulse is output. The second swinging pulse has energy for rotating the rotor 130 in a second rotation direction and swings the rotor 130.

Specifically, the first rotation direction may be the normal rotation direction and the second rotation direction may be the reverse rotation direction in the opposite direction of the first rotation direction. The first rotation direction may be the reverse rotation direction and the second rotation direction may be the normal rotation direction in the opposite direction of the first rotation direction.

Overview of Effects of the Fourth Embodiment

According to the embodiment explained above, the control circuit 103 applies the first swinging pulse and the second swinging pulse as the swinging pulse. The rotation direction of the first swinging pulse and the second swinging pulse are optional. Therefore, according to this embodiment, it is possible to suitably swing the rotor of the stepping motor 107.

Fifth Embodiment

Subsequently, a fifth embodiment is explained. First, problems that the fifth embodiment should solve are explained. The swinging pulse explained in the embodiments explained above needs to give energy suitable for the rotor not to greatly vibrate when the rotor meshes with the load tooth and to swing when the rotor meshes with the standard teeth.

For example, even the load tooth swings if the energy of the swinging pulse is excessively large. Even the standard teeth do not swing if the energy of the swinging pulse is excessively small. That is, it is desired to suitably adjust the energy of the swinging pulse with the load of a gear. An object of this embodiment is to suitably adjust the energy of the swinging pulse.

Figure 20:
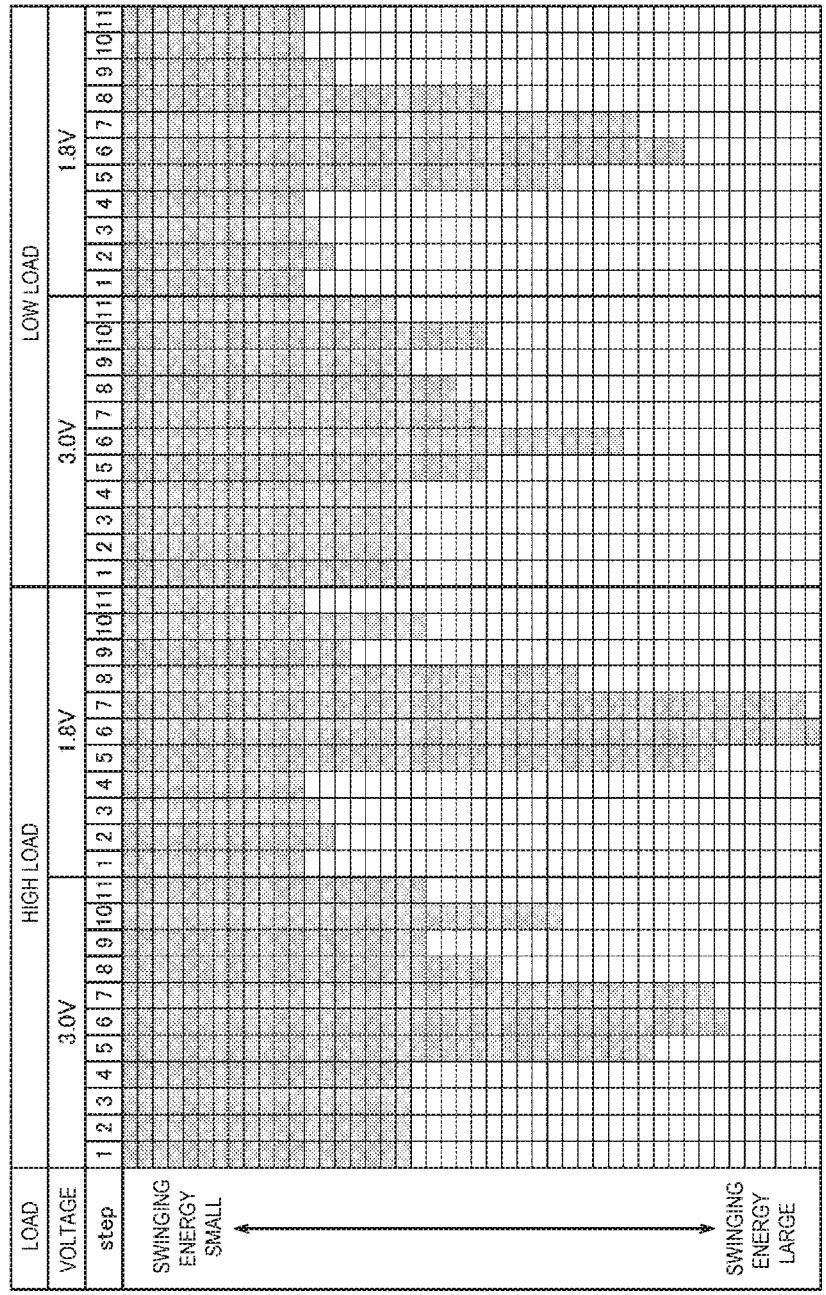
FIG. 20 is a diagram showing presence or absence of detection of an induced voltage in the case in which voltages of a driving pulse and a swinging pulse are changed in a fifth embodiment.

FIG. 20 is a diagram showing presence or absence of detection of an induced voltage in the case in which the voltages of the driving pulse and the swinging pulse are changed in the fifth embodiment. An example of a case in which a spring force of the load tooth is strong is shown on the left side in the figure as "high load". An example of a case in which a spring force of the load tooth is weak is shown on the right side of the figure as "low load". About the respective cases of the "high load" and the "low load", an example of a case in which an applied voltage of the swinging pulse is set to "3.0 [V]" and an example of a case in which the applied voltage of the swinging pulse is set to "1.8 [V]" are respectively shown. 3.0 [V] is assumed to be a power supply voltage. 1.8 [V] is assumed to be a voltage generated from a power supply voltage by a DC/DC converter, an LDO, or the like.

The vertical axis in the figure indicates the magnitude of the energy of the swinging pulse. The upper side indicates that the energy is smaller and the lower side indicates that the energy is larger. In the example shown in the figure, the energy is differentiated by, for example, changing a time in which the swinging pulse is applied. Note that the energy is different in the example of the case in which the applied voltage of the swinging pulse is set to "3.0 [V]" and the example of the case in which the applied voltage of the swinging pulse is set to "1.8 [V]".

The horizontal axis in the figure indicates a step. One cell indicates one step. In the figure, in a gear that makes one turn in 360 steps, eleven steps centering on the load tooth are shown.

Hatched cells in the figure indicate that the cells are detected as the load teeth. Unhatched cells in the figure indicate that the cells are detected as the standard teeth. Boundaries of the hatched cells and the unhatched cells indicate a minimum energy amount and a maximum energy amount of the swinging pulse. That is, it is possible to suitably detect the standard tooth and the load tooth by applying an energy amount between the minimum energy amount and the maximum energy amount as the swinging pulse.

In an example of the case of the "high load", when the swinging pulse is driven at 3.0 [V], the difference between the minimum energy amount and the maximum energy amount (that is, the difference between pulse application times) is 0.27 [ms]. When the swinging pulse is driven at 1.8 [V], the difference between the minimum energy amount and the maximum energy amount is 0.78 [ms].

In an example of the case of the "low load", when the swinging pulse is driven at 3.0 [V], the difference between the minimum energy amount and the maximum energy amount is 0.18 [ms]. When the swinging pulse is driven at 1.8 [V], the difference between the minimum energy amount and the maximum energy amount is 0.56 [ms].

In the case of the "high load" and in the case of the "low load" as well, the difference between the minimum energy amount and the maximum energy amount is larger when the swinging pulse is driven at 1.8 [V]. That is, it is possible to control the energy of the swinging pulse at higher resolution by setting the swinging pulse to a voltage smaller than the voltage of the driving pulse.

In this embodiment, in order to control the energy of the swinging pulse at high resolution, the swinging pulse is set to a voltage smaller than the voltage of the driving pulse. Specifically, the motor driving circuit 106 drives the stepping motor 107 with a first voltage (for example, 3.0 [V]) when the driving pulse is output from the control circuit 103 and drives the stepping motor 107 with a second voltage (for example, 1.8 [V]) lower than the first voltage when the swinging pulse is output from the control circuit 103.

The first voltage may be, for example, a power supply voltage of a battery that drives the timepiece 1. The second voltage may be, for example, a voltage obtained by dropping the power supply voltage of the battery with a DC/DC converter, an LDO, or the like.

Overview of Effects of the Fifth Embodiment

According to this embodiment, by setting the swinging pulse to a voltage smaller than the voltage of the driving pulse, it is possible to control the energy of the swinging pulse at high resolution. Therefore, it is possible to suitably control the energy of the swinging pulse. Accordingly, according to this embodiment, it is possible to correctly detect the standard teeth and the load teeth.

Sixth Embodiment

Subsequently, a sixth embodiment is explained below. First, problems that the stepping motor control device 100 according to the sixth embodiment is to solve are explained.

A plurality of train wheel groups included in the timepiece 1 sometimes has a large load because of longtime use. Even when a use period is short, a load of the plurality of train wheels as a whole increases depending on a state of use and a magnetic field environment. In this embodiment, when a load of a train wheel included in the timepiece 1 has increased, a deficiency such as step-out is suppressed by controlling energy for driving the stepping motor 107 to be large.

Figure 21:
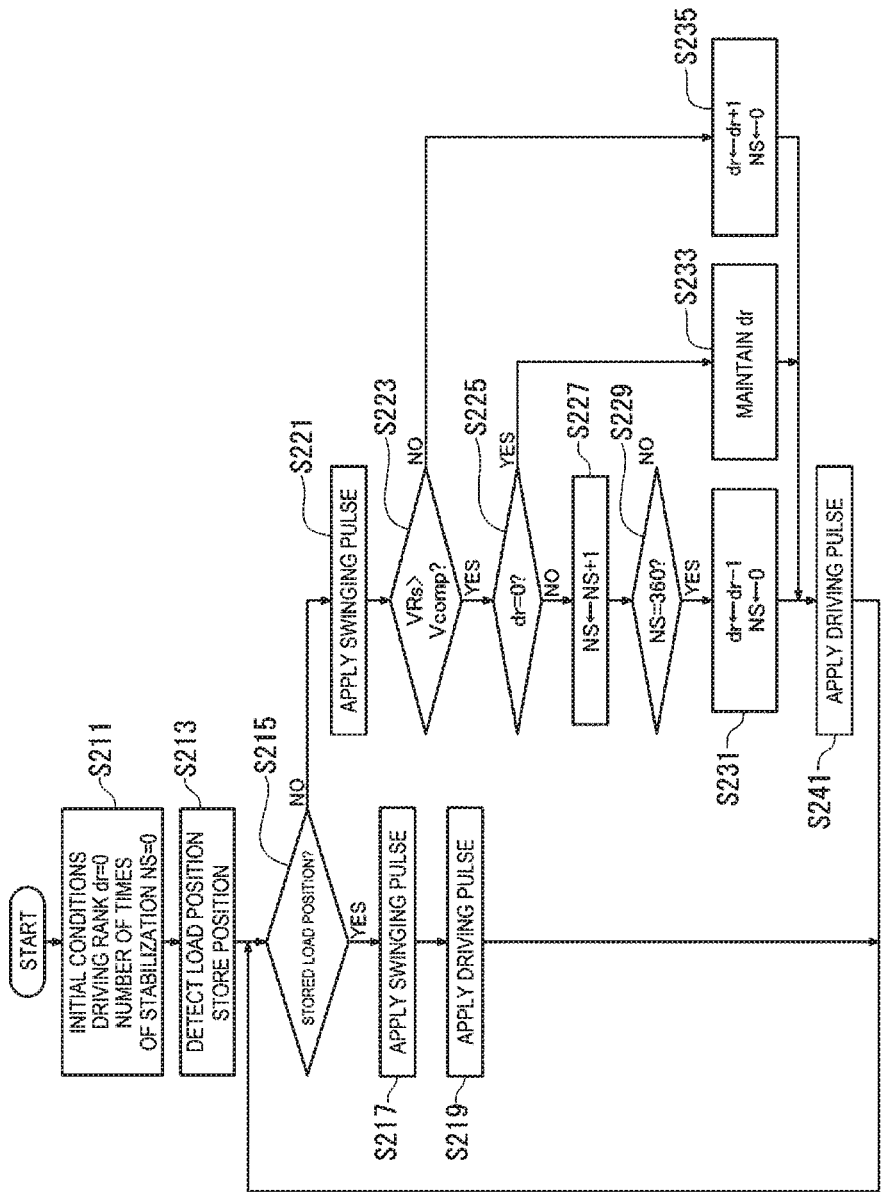
FIG. 21 is a diagram for explaining driving pulse rank control in a sixth embodiment.

FIG. 21 is a diagram for explaining driving pulse rank control in the sixth embodiment. A series of operations of the stepping motor control device 100 according to the sixth embodiment is explained with reference to the figure.

Note that a gear explained in this embodiment is explained on the premise that the gear makes one turn at 360 [step]. Processing explained in this embodiment is started at a power-on time. Thereafter, control of the processing is repeated.

(Step S211) As initial conditions, the stepping motor control device 100 sets a driving rank dr to 0 and sets the number of times of stabilization NS to 0. The driving rank dr indicates a rank of energy for driving the stepping motor 107. A larger driving rank dr indicates that the energy for driving the stepping motor 107 is larger. The number of times of stabilization NS is a counter incremented at each one step. The stepping motor control device 100 refers to the number of times of stabilization NS to thereby determine whether the driving rank dr should be changed.

(Step S213) After being turned on, the stepping motor control device 100 causes the gear to make one turn (that is, 360 [step]) and specifies the position of the load tooth. After storing the position of the load tooth, the stepping motor control device 100 advances the processing to step S215.

(Step S215) The stepping motor control device 100 determines whether the load tooth is in the stored position of the load tooth. When the load tooth is in the stored position of the load tooth (step S215; YES), the stepping motor control device 100 advances the processing to step S217. When the load tooth is not in the stored position of the load tooth (step S215; NO), the stepping motor control device 100 advances the processing to step S221.

(Step S217) The stepping motor control device 100 applies a swinging pulse to the stepping motor 107.

(Step S219) The stepping motor control device 100 applies a driving pulse to the stepping motor 107.

That is, since an induced voltage cannot be acquired in the position of the load tooth, the stepping motor control device 100 does not perform control of a driving rank.

By performing the processing in step S221 to step S241, the stepping motor control device 100 controls the driving rank dr, which is a rank of the driving pulse, based on a result obtained by determining an induced voltage VRs of the standard teeth.

(Step S221) The stepping motor control device 100 applies the swinging pulse to the stepping motor 107.

(Step S223) The stepping motor control device 100 determines whether the induced voltage VRs of the standard teeth is larger than a predetermined threshold Vcomp. When the induced voltage VRs of the standard teeth is larger than the predetermined threshold Vcomp (step S223; YES), the stepping motor control device 100 advances the processing to step S225. When the induced voltage VRs of the standard teeth is equal to or smaller than the predetermined threshold Vcomp (step S223; NO), the stepping motor control device 100 advances the processing to step S235.

(Step S225) The stepping motor control device 100 determines whether the driving rank dr is 0. When the driving rank dr is 0 (step S225; YES), the stepping motor control device 100 advances the processing to step S233. When the driving rank dr is not 0 (step S225; NO), the stepping motor control device 100 advances the processing to step S227.

(Step S227) The stepping motor control device 100 increments the number of times of stabilization NS by 1.

(Step S229) The stepping motor control device 100 determines whether the number of times of stabilization NS is 360. When the number of times of stabilization NS is 360 (step S229; YES), the stepping motor control device 100 advances the processing to step S231. When the number of times of stabilization NS is not 360 (step S229; NO), the stepping motor control device 100 advances the processing to step S233.

(Step S231) The stepping motor control device 100 subtracts 1 from the driving rank dr. That is, the stepping motor control device 100 drives the stepping motor 107 with smaller energy the next and subsequent times. The stepping motor control device 100 sets the number of times of stabilization NS to 0.

(Step S233) The stepping motor control device 100 maintains the driving rank dr.

(Step S235) The stepping motor control device 100 adds 1 to the driving rank dr. That is, the stepping motor control device 100 drives the stepping motor 107 with larger energy the next and subsequent times. The stepping motor control device 100 sets the number of times of stabilization NS to 0.

(Step S241) The stepping motor control device 100 applies a driving pulse to the stepping motor 107.

Overview of Effects of the Sixth Embodiment

According to the embodiment explained above, by including the control circuit 103, the stepping motor control device 100 increases the rank of the driving pulse when the induced voltage Vrs is smaller than the predetermined threshold Vcomp. That is, when the mechanical load received by the rotor determined by the determination circuit 104 is smaller than the predetermined threshold, the control circuit 103 applies, among driving pulses of a plurality of ranks having different energies, a driving pulse of a larger rank than a driving pulse applied immediately before the driving pulse.

By including the control circuit 103, when the induced voltage Vrs is larger than the predetermined threshold Vcomp, the stepping motor control device 100 reduces the rank of the driving pulse after the number of times equivalent to approximately one turn of the gear elapses as the number of times of stabilization NS. That is, when a result indicating that the mechanical load received by the rotor determined by the determination circuit 104 is larger than the predetermined threshold is continuously obtained a predetermined number of times or more, the control circuit 103 applies, among the driving pulses of the plurality of ranks having different energies, a driving pulse of a smaller rank than a driving pulse applied immediately before the driving pulse.

According to the embodiment explained above, even when the load of the train wheel included in the timepiece 1 increases, it is possible to suppress a deficiency such as step-out by controlling the energy for driving the stepping motor 107 to be large.

When the energy of the driving pulse is reduced, it is possible to prevent a problem such as step-out from occurring because, after a load equivalent to one turn of the gear 1 is determined, the energy of the driving pulse is reduced by mistake because the load deflects.

Seventh Embodiment

Subsequently, a seventh embodiment is explained. First, problems that the stepping motor control device 100 according to the seventh embodiment is to solve are explained.

As explained above, the swinging pulse detects a mechanical load by swinging the rotor. In particular, about the gear including the standard teeth and the load teeth, by detecting the mechanical load, it is possible to determine whether the rotor meshes with the standard teeth or meshes with the load tooth. If the energy of the swinging pulse is excessively large, the rotor sometimes swings even when the rotor meshes with the load tooth. If the energy of the swinging pulse is excessively small, the rotor sometimes does not swing even when the rotor meshes with the standard teeth. Accordingly, it is requested to set the energy of the swinging pulse to appropriate energy. In this embodiment, the energy of the swinging pulse is adjusted to appropriate energy.

Figure 22:
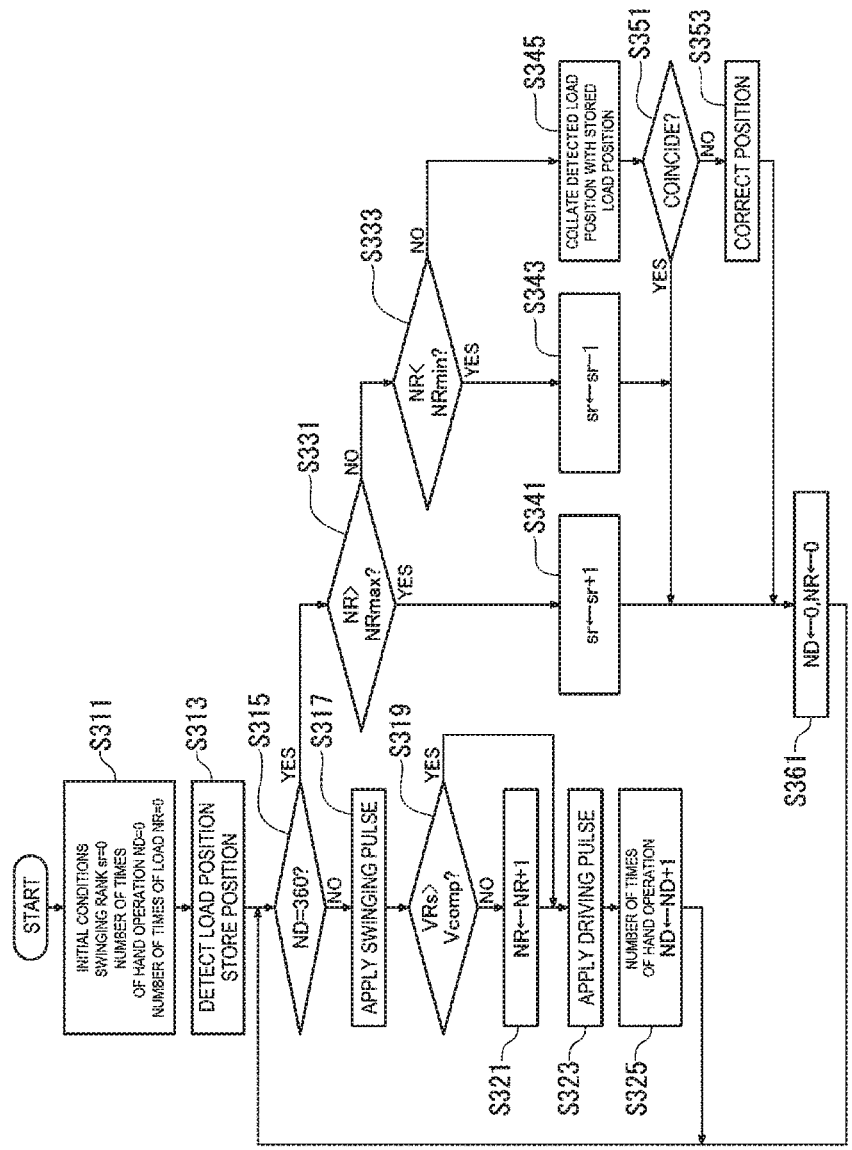
FIG. 22 is a diagram for explaining swinging pulse rank control in a seventh embodiment.

FIG. 22 is a diagram for explaining swinging pulse rank control in the seventh embodiment. A series of operations of the stepping motor control device 100 according to the seventh embodiment is explained with reference to the figure.

Note that a gear explained in this embodiment is assumed about a case in which one load tooth is provided in each of a gear for rough adjustment and a gear for fine adjustment. The following explanation is based on the premise that the gear for rough adjustment makes one turn at 360 [step] and the gear for fine adjustment makes one turn at 45 [step]. That is, the gear for fine adjustment makes eight turns while the gear for rough adjustment makes one turn.

Processing explained in this embodiment is started at a power-on time. Thereafter, control of the processing is repeated.

(Step S311) As initial conditions, the stepping motor control device 100 sets a swinging rank sr to 0, sets the number of times of hand operation ND to 0, and sets the number of times of load NR to 0. The swinging rank sr indicates a rank of energy at the time when the rotor is swung by a swinging pulse. A larger swinging rank sr indicates larger energy. The number of times of hand operation ND is a counter incremented at each one step. The number of times of hand operation ND is different from the number of times of stabilization NS in that the number of times of hand operation ND includes both of the numbers of times of hand operation of the standard tooth and the load tooth. The number of times of load NR is the number of times it is determined that the gear meshes with the load tooth while the gear makes one turn.

(Step S313) After being turned on, the stepping motor control device 100 causes the gear to make one turn (that is, 360 [step]) and specifies the position of the load tooth. After storing the position of the load tooth, the stepping motor control device 100 advances the processing to step S315.

(Step S315) The stepping motor control device 100 determines whether the number of times of hand operation ND is 360. When the number of times of hand operation ND is 360 (step S315; YES), the stepping motor control device 100 advances the processing to step S331. When the number of times of hand operation ND is not 360 (step S315; NO), the stepping motor control device 100 advances the processing to step S317.

(Step S317) The stepping motor control device 100 applies a swinging pulse to the stepping motor 107.

(Step S319) The stepping motor control device 100 determines whether the induced voltage VRs is larger than the predetermined threshold Vcomp. When the induced voltage VRs is larger than the predetermined threshold Vcomp (step S319; YES), the stepping motor control device 100 advances the processing to step S323. When the induced voltage VRs is equal to or smaller than the predetermined threshold Vcomp (step S319; NO), the stepping motor control device 100 advances the processing to step S321.

(Step S321) The stepping motor control device 100 increments the number of times of load NR. That is, the stepping motor control device 100 counts the number of times it is determined that the gear meshes with the load tooth.

(Step S323) The stepping motor control device 100 applies a driving pulse to the stepping motor 107.

(Step S325) The stepping motor control device 100 increments the number of times of hand operation ND.

(Step S331) The stepping motor control device 100 determines whether the number of times of load NR is larger than a number of times of load maximum value NRmax. When the number of times of load NR is larger than the number of times of load maximum value NRmax (step S331; YES), the stepping motor control device 100 advances the processing to step S341. When the number of times of load NR is equal to or smaller than the number of times of load maximum value NRmax (step S331; NO), the stepping motor control device 100 advances the processing to step S333.

(Step S333) The stepping motor control device 100 determines whether the number of times of load NR is smaller than a number of times of load minimum value NRmin. When the number of times of load NR is smaller than the number of times of load minimum value NRmin (step S333; YES), the stepping motor control device 100 advances the processing to step S343. When the number of times of load NR is equal to or larger than the number of times of load minimum value NRmin (step S33; NO), the stepping motor control device 100 advances the processing to step S345.

The number of times of load maximum value NRmax is, for example, 28. The number of times of load minimum value NRmin is, for example, 9. In this embodiment, since the gear for fine adjustment makes eight turns while the gear for rough adjustment makes one turn, it is determined that the gear meshes with the load tooth at least nine times while the gear for rough adjustment makes one turn (360 [step]). Therefore, the number of times of load minimum value NRmin is set to 9. Since a plurality of times of induced voltages sometimes continuously detected for the load tooth, the number of times of load maximum value NRmax is set to 28 assuming that the induced voltage is detected approximately three times per one tooth.

Note that the numbers of the number of times of load maximum value NRmax and the number of times of load minimum value NRmin are optional and may be determined according to, for example, the number of steps of the gear of the load tooth.

(Step S341) The stepping motor control device 100 adds 1 to the swinging rank sr. That is, the stepping motor control device 100 applies a swinging pulse having larger energy the next and subsequent times.

(Step S343) The stepping motor control device 100 subtracts 1 from the swinging rank sr. That is, the stepping motor control device 100 applies a swinging pulse having smaller energy the next and subsequent times.

(Step S345) The stepping motor control device 100 determines that the energy of the swinging pulse is appropriate. The stepping motor control device 100 collates a detected load position with the load position stored in step S313.

(Step S351) When the detected position and the stored position coincide (step S351; YES), the stepping motor control device 100 advances the processing to step S361. When the detected position and the stored position do not coincide (step S351; NO), the stepping motor control device 100 advances the processing to step S353.

(Step S353) The stepping motor control device 100 corrects the position of the load tooth from the stored position to the detected position.

(Step S361) The stepping motor control device 100 sets the number of times of hand operation ND and the number of times of load NR to 0.

Overview of Effects of the Seventh Embodiment

According to the embodiment explained above, by including the control circuit 103, the stepping motor control device 100 controls the rank of the swinging pulse based on the number of times it is determined that the gear meshes with the load tooth while the gear makes one turn. That is, when the gear including the load tooth makes one turn, based on the number of times it is determined by the determination circuit 104 that the mechanical load received by the rotor is larger than the predetermined threshold, the stepping motor control device 100 selects a swinging pulse of which rank among swinging pulses of a plurality of ranks having different energies is applied.

According to the embodiment explained above, even when the load of the train wheel included in the timepiece 1 fluctuates, it is possible to set the energy of the swinging pulse to appropriate energy by controlling the energy of the swinging pulse. Therefore, according to this embodiment, it is possible to accurately determine the mechanical load.

Eighth Embodiment

Subsequently, an eighth embodiment is explained. In the eighth embodiment, the processing explained in the sixth embodiment and the processing explained in the seventh embodiment are performed in combination. Processing in the eighth embodiment is explained with reference to FIG. 23.

Figure 23:
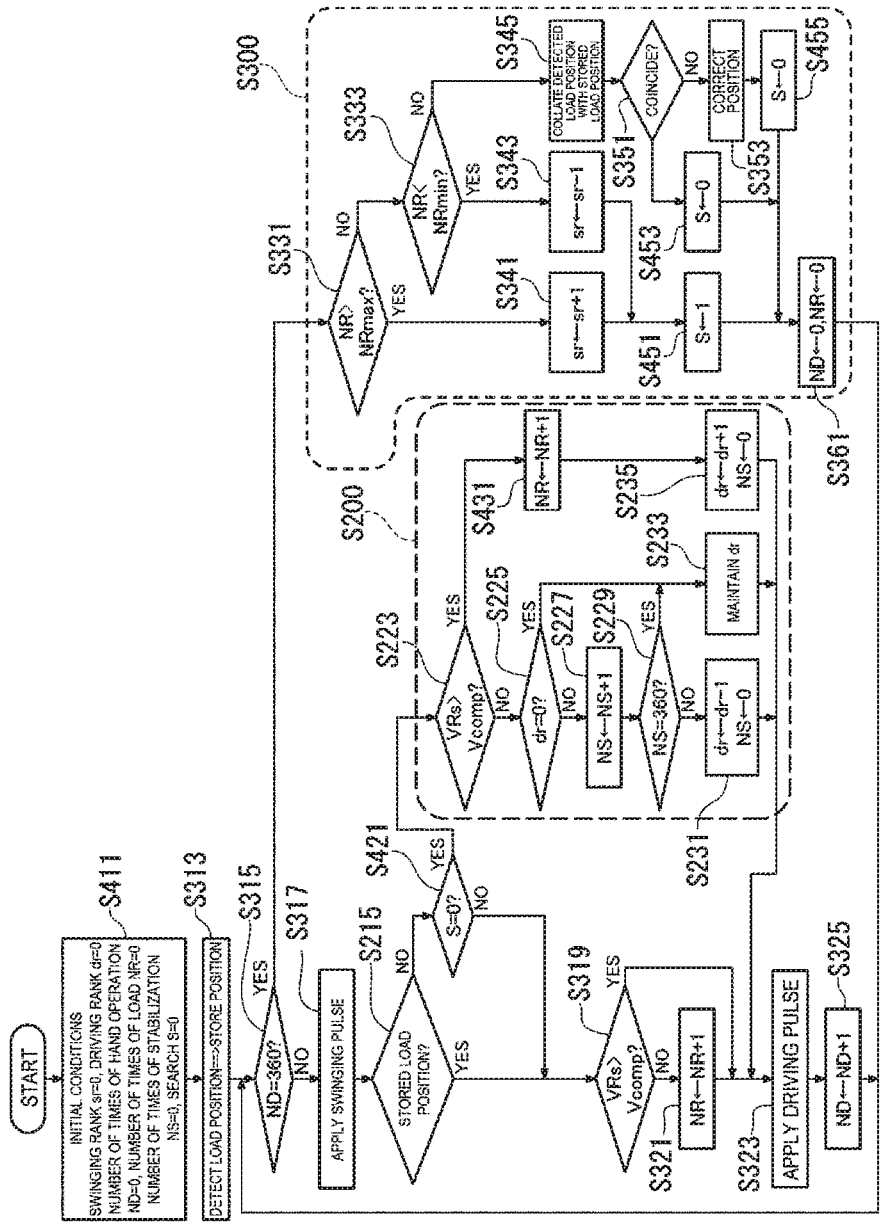
FIG. 23 is a diagram for explaining an example of a case in which driving pulse rank control and swinging pulse control are combined in an eighth embodiment.

FIG. 23 is a diagram for explaining an example of a case in which the driving pulse rank control and the swinging pulse control in the eighth embodiment are combined. About the processing in the eighth embodiment, explanation of the same processing as the processing explained in the sixth embodiment and the processing explained in the seventh embodiment is sometimes omitted by adding the same signs to the processing. The processing explained in the sixth embodiment is described as step S200. The processing explained in the seventh embodiment is described as step S300.

(Step S411) As initial conditions, the stepping motor control device 100 sets the swinging rank sr to 0, sets the driving rank dr to 0, sets the number of times of hand operation ND to 0, sets the number of times of load NR to 0, sets the number of times of stabilization NS to 0, and sets a search S to 0. The eighth embodiment is different from the processing explained in the sixth embodiment and the seventh embodiment in that the eighth embodiment includes the search S.

While a rank of a swinging pulse is controlled, since it is unknown whether hands correctly coincide, control of a driving pulse is not performed. That is, when both of the rank of the swinging pulse and the rank of the driving pulse are controlled, the search S has a role of a flag indicating a period in which the rank of the swinging pulse is controlled.

(Step S421) When the detected load position is not the stored load position, the stepping motor control device 100 determines whether the search S is 0. The search S being 0 indicates a state in which the rank of the swinging pulse is not determined. When the search S is not 0 (that is, step S421; NO), the stepping motor control device 100 advances the processing to step S319 and does not perform the control of the driving rank. When the search S is 0 (that is, step S421; YES), the stepping motor control device 100 advances the processing to step S223 and performs the control of the driving rank.

(Step S431) The stepping motor control device 100 increments the number of times of load NR. That is, the stepping motor control device 100 counts the number of times it is determined that the gear meshes with the load tooth. The processing is the same processing as step S321 in the seventh embodiment.

The stepping motor control device 100 performs the setting of the search S in step S451 to step S455.

(Step S451) The stepping motor control device 100 sets the search S to 1.

(Step S453) The stepping motor control device 100 sets the search S to 0.

(Step S455) The stepping motor control device 100 sets the search S to 0.

Overview of Effects of the Eighth Embodiment

According to the embodiment explained above, the stepping motor control device 100 sets the search S to 1 in a period in which the rank control of the swinging pulse is performed and does not perform the control of the driving pulse when the search S is 1. That is, the stepping motor control device 100 does not perform the control of the driving pulse while the stepping motor control device 100 controls the rank of the swinging pulse.

Therefore, according to the embodiment explained above, the stepping motor control device 100 can prevent a situation in which the stepping motor control device 100 determines the rank of the driving pulse by mistake while the stepping motor control device 100 controls the rank of the swinging pulse.

Note that all or a part of the functions included in the timepiece 1 explained above may be recorded in a computer-readable recording medium as a program and the program may be executed by a computer system. The computer system includes an OS and hardware such as peripheral devices. The computer-readable recording medium is, for example, a portable medium such as a flexible disk, a magneto-optical disk, a ROM (Read Only Memory), or a CD-ROM, a storage device such as a hard disk incorporated in the computer system, or a volatile memory (a Random Access Memory: RAM) included in a server or the like on a network such as the Internet. Note that the volatile memory is an example of a recording medium that retains the program for a fixed time.

The program may be transmitted to other computer systems by a transmission medium, for example, a network such as the Internet or a communication line such as a telephone line.

The program may be a program for realizing all or a part of the functions explained above. Note that the program for realizing a part of the functions explained above may be a program that can realize the functions explained above in combination with a program recorded in advance in the computer system, a so-called differential program.

The embodiments of the present invention are explained above with reference to the drawings. However, a specific configuration is not limited to the embodiments explained above. A design change and the like in a range not departing from the gist of the present invention are also included in the present invention.

What is claimed is:

1. A stepping motor control device comprising:
    a stepping motor comprising a coil that is energized by a driving pulse to rotate a rotor that rotates a hand;
    a control unit configured to output the driving pulse and a swinging pulse for swinging the rotor to the stepping motor in such a manner that the swinging pulse precedes the driving pulse without a replicated swinging pulse having a voltage and a polarity of the swinging pulse applied between the swinging pulse and the driving pulse;
    a voltage detecting unit configured to detect an induced voltage generated in the coil by swinging of the rotor caused by application of the swinging pulse to the stepping motor; and
    a determining unit configured to determine a mechanical load received by the rotor, based on the induced voltage detected by the voltage detecting unit.

2. The stepping motor control device according to claim 1, wherein the swinging pulse precedes the driving pulse by a predetermined time period.

3. The stepping motor control device according to claim 1, further comprising a first gear that rotates according to rotation of the rotor and a second gear that engages with the first gear, the second gear having a load tooth formed mechanically different from a rest of teeth of the second gear, wherein the determining unit is configured to detect a change of the mechanical load that occurs when the first gear becomes in contact with the load tooth of the second gear.

4. The stepping motor control device according to claim 1, wherein the control unit it configured to control, according to the change of the mechanical load detected by the determining unit, energy of the driving pulse for driving the stepping motor.

5. The stepping motor control device according to claim 4, wherein the control unit is configured to control a pulse duration of the driving pulse to thereby control the energy of the driving pulse.

6. The stepping motor control device according to claim 4, wherein the control unit controls exciting the coil of the stepping motor to control the energy of the driving pulse.

7. The stepping motor control device according to claim 4, wherein the control unit is configured to control a duty ratio of the driving pulse to control the energy of the driving pulse.

8. The stepping motor control device according to claim 4, wherein the control unit is configured to control a voltage of the driving pulse to control the energy of the driving pulse.

9. The stepping motor control device according to claim 1, wherein the control unit is further configured to output a second swinging pulse between the swinging pulse and the driving pulse, wherein the swinging pulse has energy in a first rotation direction, and the second swinging pulse has energy in a second rotation direction opposite to the first rotation direction.

10. The stepping motor control device according to claim 9, wherein the first rotation direction is a normal rotation direction, and the second rotation direction is opposite to the first rotation direction.

11. The stepping motor control device according to claim 10, wherein the control unit is further configured to output only the first swinging pulse when the swinging pulse is output according to a predetermined cycle at which the driving pulse is output and output both the swinging pulse and the second swinging pulse when the swinging pulse is output at a predetermined timing not corresponding to the predetermined cycle at which the driving pulse is output.

12. The stepping motor control device according to claim 1, wherein the determining unit is further configured to determine the mechanical load when the induced voltage value detected by the voltage detecting unit exceeds a predetermined threshold.

13. The stepping motor control device according to claim 1, wherein the determining unit is further configured to determine the mechanical load when the induced voltage is detected by the voltage detecting unit within a predetermined period.

14. The stepping motor control device according to claim 1, wherein the control unit is further configured to operate in either a swinging pulse output mode in which the swinging pulse is output or a swinging pulse non-output mode in which the swinging pulse is kept from being output.

15. The stepping motor control device according to claim 1, wherein the driving unit drives the stepping motor at a first voltage when the driving pulse is output from the control unit and drives the stepping motor at a second voltage lower than the first voltage when the swinging pulse is output from the control unit.

16. The stepping motor control device according to claim 1, wherein the control unit is further configured to output the driving pulse at a selected one of different ranks of energy so that the driving pulse is output at a rank of energy higher than the immediately preceding driving pulse when the induced voltage resulting from the mechanical load is determined by the determining unit to be smaller than a predetermined threshold, and the driving pulse is output at a rank of energy smaller than the immediately preceding driving pulse when the induced voltage resulting from the mechanical load is determined by the determining unit to be larger than the predetermined threshold for a predetermined consecutive times or more.

17. The stepping motor control device according to claim 3, wherein the control unit is configured to output the swinging pulse at a selected one of different ranks of energy, and the control unit is further configured to control the swinging pulse in such a manner that every time the second gear makes one turn, the control unit selects one of the different ranks of energy based on a number of times the mechanical load is determined by the determining unit to be larger than a predetermined threshold.

18. The stepping motor control device according to claim 17, wherein the control unit is further configured to avoid performing control of the driving pulse while controlling the swinging pulse.

19. A movement comprising:
the stepping motor control device according to claim 1; and
the stepping motor.

20. A timepiece comprising the movement according to claim 19.

21. A method for controlling a stepping motor that comprises a rotor that rotates a hand and a coil that generates a magnetic flux for rotating the rotor, the method comprising:
applying a swinging pulse to the stepping motor for swinging the rotor;
applying a driving pulse to the stepping motor to rotate the rotor, the swinging pulse precedes the driving pulse without a replicated swinging pulse having a voltage and a polarity of the swinging pulse applied between the swinging pulse and the driving pulse;
detecting an induced voltage generated in the coil by application of the swinging pulse to the stepping motor; and
determining a mechanical load received by the rotor, based on the detected induced voltage.

* * * * *